(12) United States Patent  (10) Patent No.: US 7,690,824 B2
Uken et al. (45) Date of Patent: Apr. 6, 2010

(54) MIRROR ASSEMBLY FOR VEHICLE

(75) Inventors: John T. Uken, Jenison, MI (US); Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 12/107,357

(22) Filed: Apr. 22, 2008

(65) Prior Publication Data

US 2008/0259462 A1 Oct. 23, 2008

Related U.S. Application Data

(63) Continuation of application No. 11/140,396, filed on May 27, 2005, now Pat. No. 7,360,932.

(60) Provisional application No. 60/575,904, filed on Jun. 1, 2004, provisional application No. 60/624,320, filed on Nov. 2, 2004.

(51) Int. Cl.
*B60Q 1/26* (2006.01)
*B60R 1/12* (2006.01)
(52) U.S. Cl. ...................... 362/494; 362/488
(58) Field of Classification Search ................. 362/459, 362/471, 488, 492, 494; 359/367, 365; 340/461, 340/995.17; 307/10.1
See application file for complete search history.

(56) References Cited

U.S. PATENT DOCUMENTS

| 4,602,135 | A | 7/1986 | Phalen |
| 4,862,594 | A | 9/1989 | Schierbeek et al. |
| 4,937,945 | A | 7/1990 | Schofield et al. |
| 5,066,112 | A | 11/1991 | Lynam et al. |
| 5,131,154 | A | 7/1992 | Schierbeek et al. |
| 5,255,442 | A | 10/1993 | Schierbeek et al. |
| 5,479,155 | A | 12/1995 | Zeinstra et al. |
| 5,523,730 | A | 6/1996 | Van Zeeland |
| 5,530,240 | A | 6/1996 | Larson et al. |
| 5,561,278 | A | 10/1996 | Rutten |
| 5,632,092 | A | 5/1997 | Blank et al. |
| 5,660,096 | A | 8/1997 | Friedrichsen |
| 5,668,663 | A | 9/1997 | Varaprasad et al. |
| 5,724,187 | A | 3/1998 | Varaprasad et al. |
| 5,798,688 | A | 8/1998 | Schofield |
| 5,867,082 | A | 2/1999 | Van Zeeland |
| 5,924,212 | A | 7/1999 | Domanski |
| 5,967,299 | A | 10/1999 | de Richecour et al. |
| 5,971,552 | A | 10/1999 | O'Farrell et al. |
| 5,990,772 | A | 11/1999 | Van Zeeland |

(Continued)

*Primary Examiner*—Jacob Y Choi
(74) *Attorney, Agent, or Firm*—Van Dyke, Gardner, Linn & Burkhart LLP

(57) ABSTRACT

An interior rearview mirror assembly includes a mirror reflective element having a front surface, a rear surface and a reflector. A display element is disposed to the rear of the rear surface and is operable to emit light when actuated, the emitted light passing through the mirror reflective element to be viewable to a driver of the vehicle. A garage door opener device is included in the rearview mirror assembly, which includes at least one user actuatable input device associated with operation of the garage door opener device. Actuation of at least one user actuatable input device causes the display element to provide a visual indication to the driver viewing the front surface, when the mirror assembly is installed in the vehicle, of at least one of (i) operation of the garage door opener device and (ii) coding the garage door opener device.

7 Claims, 15 Drawing Sheets

U.S. PATENT DOCUMENTS

| | | |
|---|---|---|
| 6,001,486 A | 12/1999 | Varaprasad et al. |
| 6,023,213 A | 2/2000 | Van Zeeland |
| 6,069,552 A | 5/2000 | Van Zeeland |
| 6,069,945 A | 5/2000 | Brown et al. |
| 6,124,886 A | 9/2000 | DeLine et al. |
| 6,137,387 A | 10/2000 | Van Zeeland |
| 6,243,003 B1 | 6/2001 | DeLine et al. |
| 6,262,646 B1 | 7/2001 | Van Zeeland |
| 6,262,831 B1 * | 7/2001 | Bauer et al. ............. 359/265 |
| 6,278,377 B1 | 8/2001 | DeLine et al. |
| 6,310,611 B1 | 10/2001 | Caldwell |
| 6,320,282 B1 | 11/2001 | Caldwell |
| 6,329,925 B1 | 12/2001 | Skiver et al. |
| 6,346,698 B1 * | 2/2002 | Turnbull ............. 250/214 R |
| 6,362,771 B1 | 3/2002 | Schofield et al. |
| 6,369,804 B1 | 4/2002 | Sandbach |
| 6,386,742 B1 | 5/2002 | DeLine et al. |
| 6,396,408 B2 | 5/2002 | Drummond et al. |
| 6,420,975 B1 | 7/2002 | DeLine et al. |
| 6,437,258 B1 | 8/2002 | Sandbach |
| 6,452,479 B1 | 9/2002 | Sandbach |
| 6,492,980 B2 | 12/2002 | Sandbach |
| 6,501,387 B2 | 12/2002 | Skiver et al. |
| 6,501,465 B2 | 12/2002 | Sandbach |
| 6,504,531 B1 | 1/2003 | Sandbach |
| 6,522,451 B1 | 2/2003 | Lynam |
| 6,627,918 B2 | 9/2003 | Getz et al. |
| 6,672,744 B2 | 1/2004 | DeLine et al. |
| 6,690,268 B2 | 2/2004 | Schofield et al. |
| 6,824,281 B2 | 11/2004 | Schofield et al. |
| 6,870,655 B1 | 3/2005 | Northman et al. |
| 6,870,656 B2 | 3/2005 | Tonar et al. |
| 6,877,888 B2 | 4/2005 | DeLine et al. |
| 6,967,299 B2 | 11/2005 | Howie et al. |
| 7,075,511 B1 | 7/2006 | Mousseau et al. |
| 7,158,881 B2 | 1/2007 | McCarthy et al. |
| 7,224,324 B2 * | 5/2007 | Quist et al. ............. 345/7 |
| 7,360,932 B2 | 4/2008 | Uken et al. |
| 2002/0044065 A1 | 4/2002 | Quist et al. |
| 2002/0159270 A1 | 10/2002 | Lynam et al. |
| 2004/0032675 A1 | 2/2004 | Weller et al. |
| 2004/0128065 A1 | 7/2004 | Taylor et al. |
| 2004/0196179 A1 | 10/2004 | Turnbull |
| 2004/0202001 A1 | 10/2004 | Roberts et al. |
| 2004/0257200 A1 | 12/2004 | Baumgardner et al. |
| 2004/0264011 A1 | 12/2004 | Lynam |
| 2005/0078389 A1 | 4/2005 | Kulas et al. |
| 2005/0099693 A1 | 5/2005 | Schofield et al. |
| 2005/0134983 A1 | 6/2005 | Lynam |
| 2005/0169003 A1 | 8/2005 | Lindahl et al. |
| 2005/0187675 A1 | 8/2005 | Schofield et al. |
| 2005/0195488 A1 | 9/2005 | McCabe et al. |

* cited by examiner

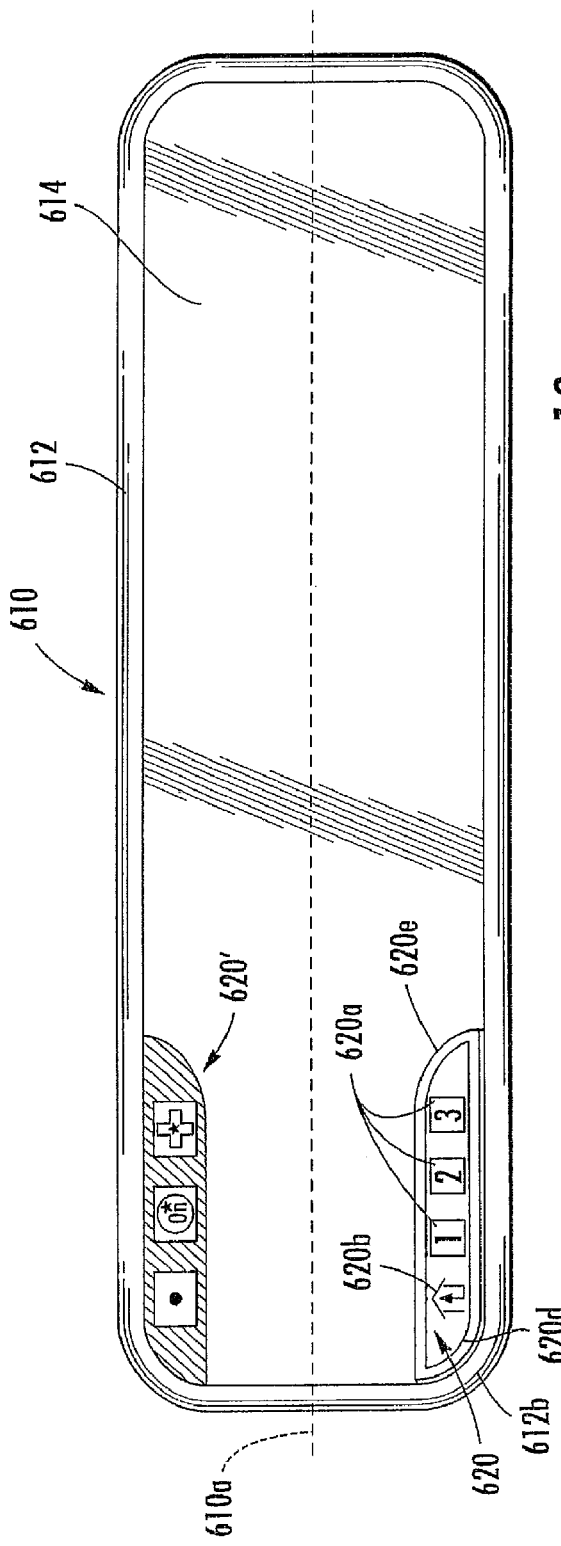
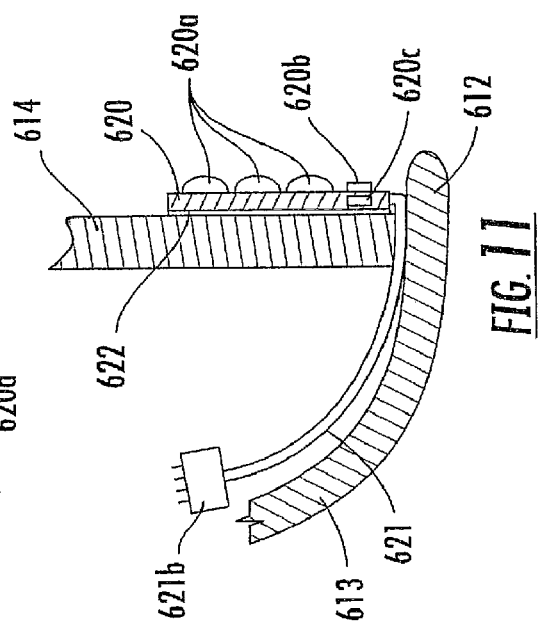
FIG. 10
FIG. 11

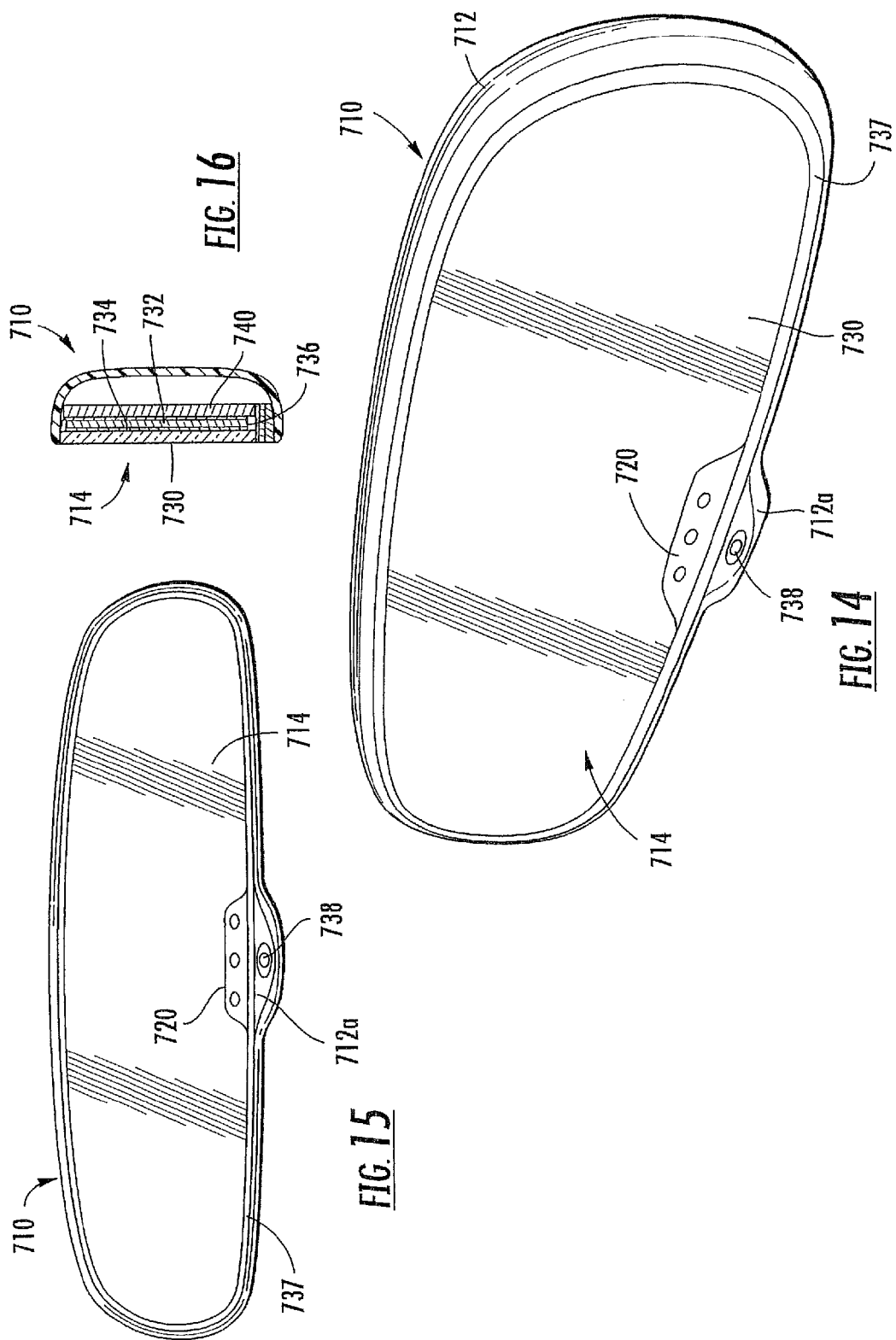

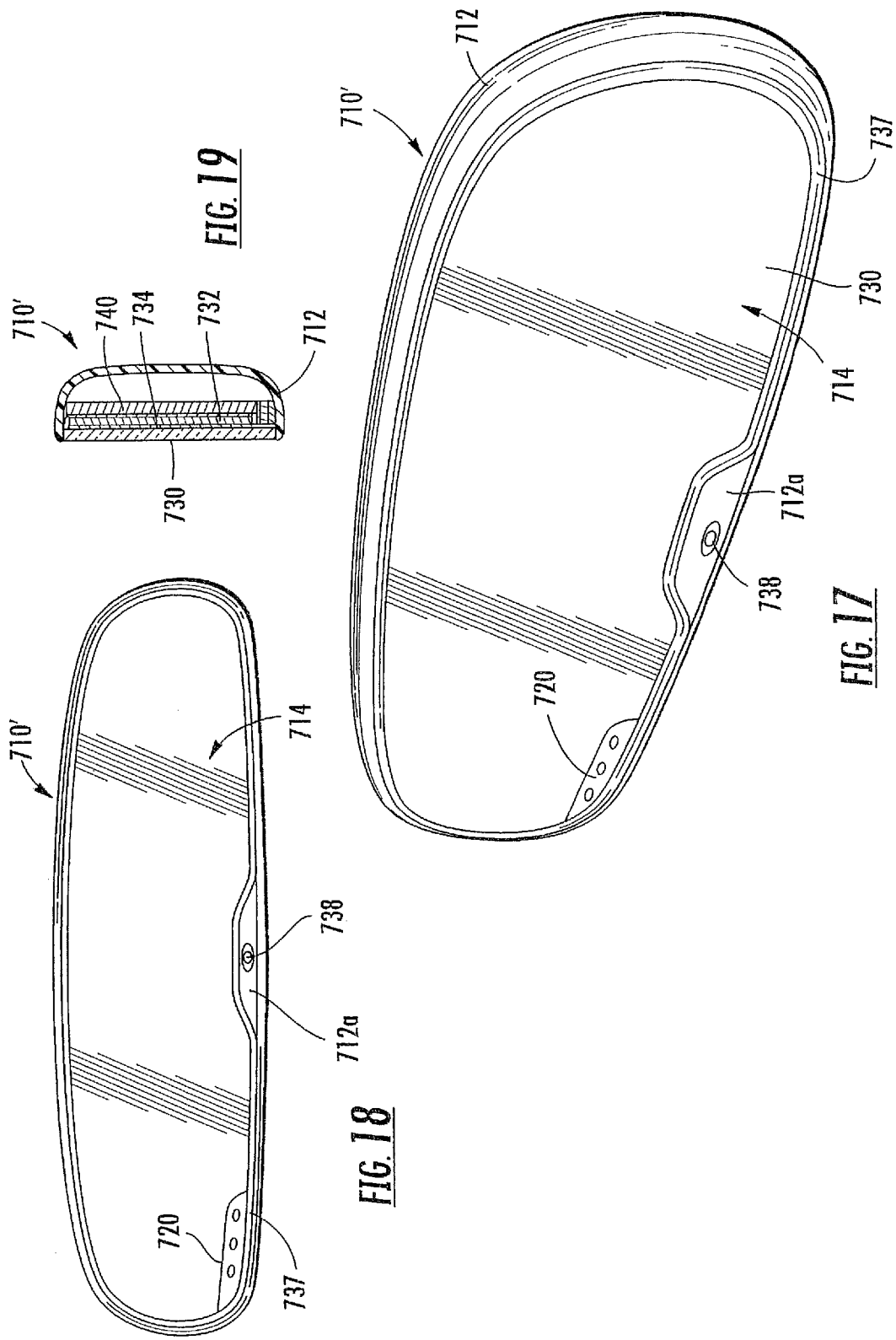

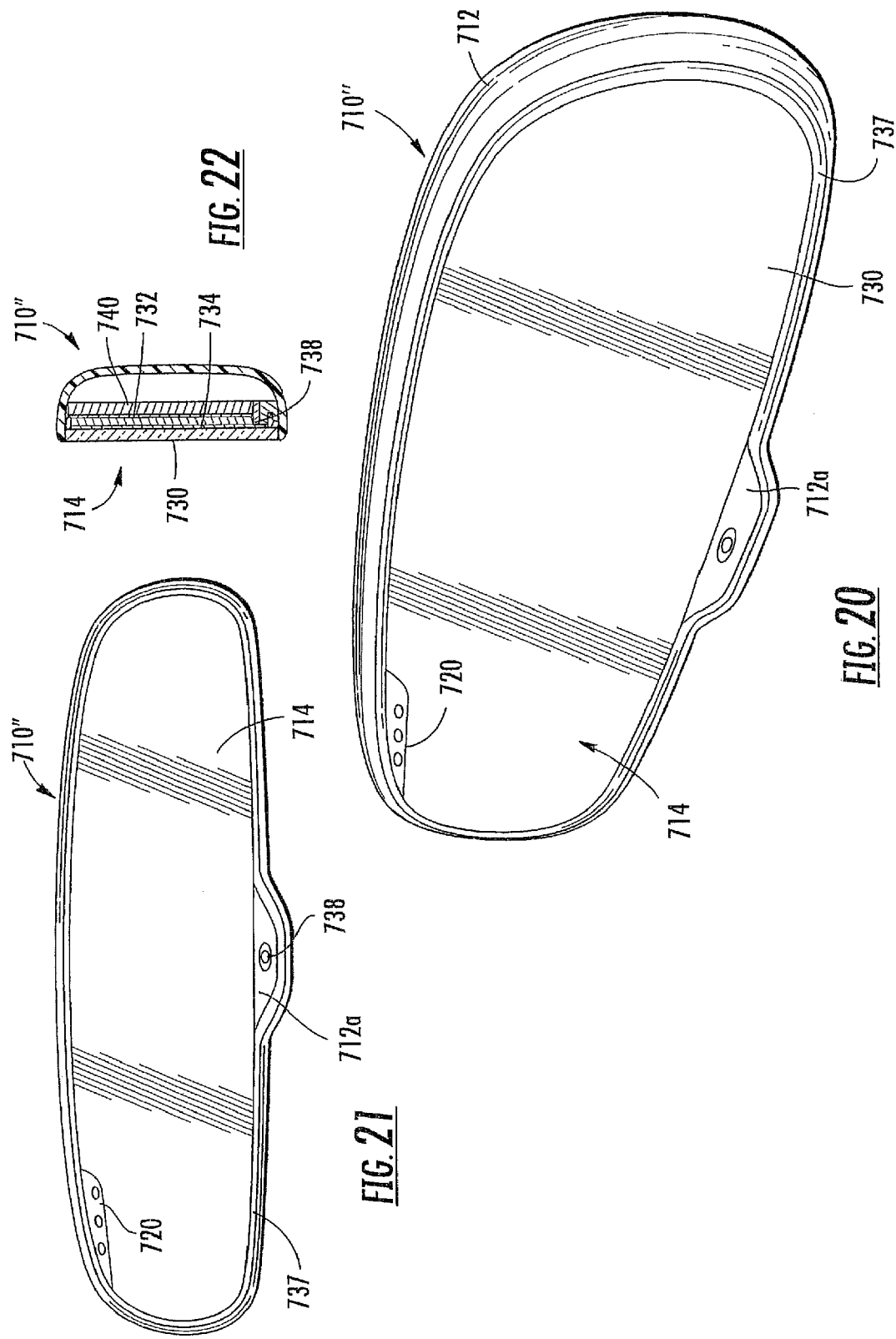

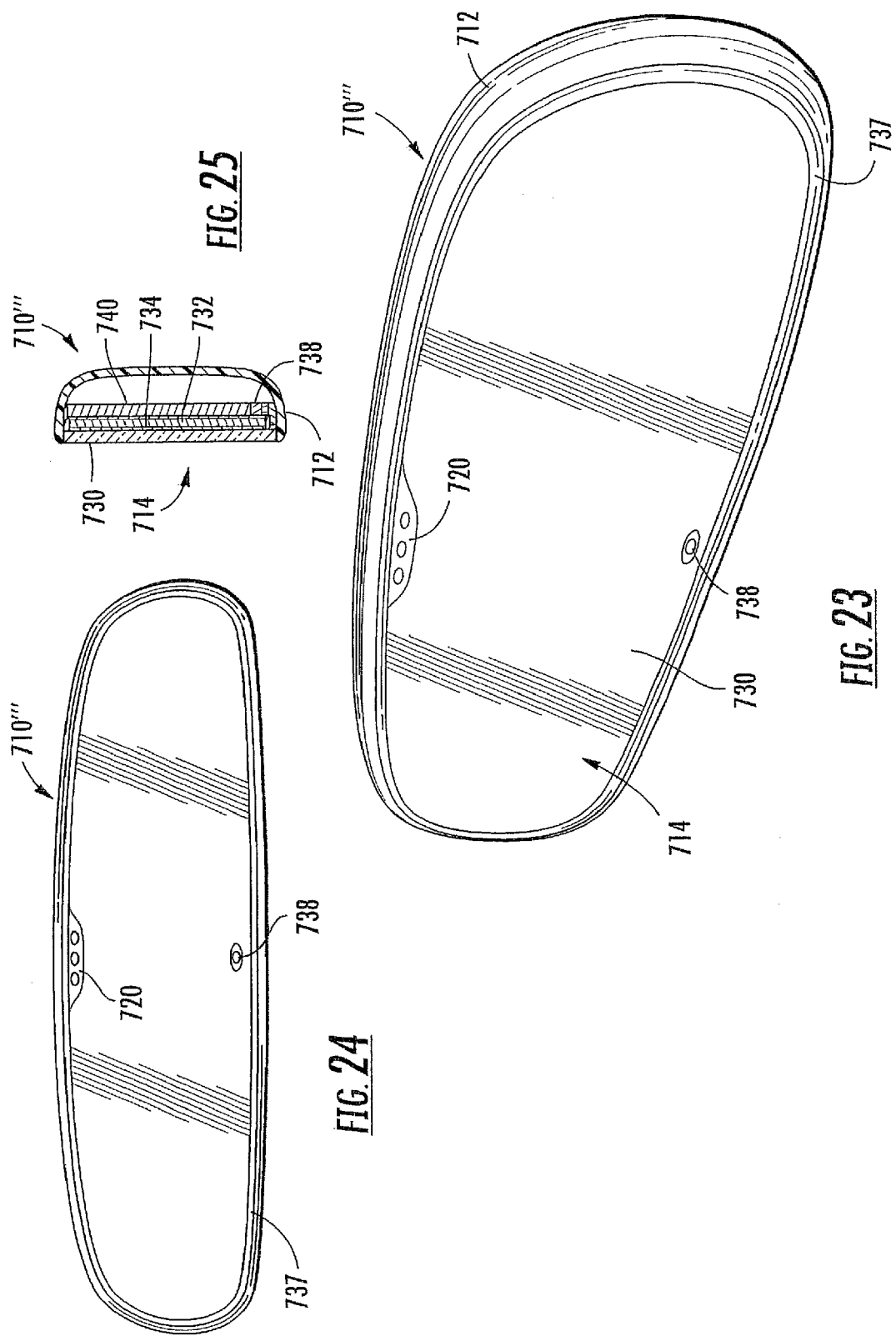

MIRROR ASSEMBLY FOR VEHICLE

CROSS REFERENCE TO RELATED APPLICATIONS

The present application is a continuation of U.S. patent application Ser. No. 11/140,396, filed May 27, 2005, now U.S. Pat. No. 7,360,932, which claims benefit of U.S. provisional applications, Ser. No. 60/575,904, filed Jun. 1, 2004; and Ser. No. 60/624,320, filed Nov. 2, 2004, which are hereby incorporated herein by reference in their entireties.

FIELD OF THE INVENTION

The present invention relates generally to the field of interior rearview mirror assemblies for vehicles and, more particularly, to interior rearview mirror assemblies which incorporate an accessory or feature, particularly an electronic accessory or feature.

BACKGROUND OF THE INVENTION

It is often desirable to provide an electronic feature in or at a vehicular interior rearview mirror assembly, such as a trainable garage door opener, a compass sensor and/or compass display, a tire pressure monitoring system receiver and/or display and/or the like, often along with the user inputs or buttons or switches associated with such systems and/or displays. The buttons may comprise manual push buttons positioned along a lower chin portion of the bezel or casing of the mirror assembly or may be touch or proximity-sensing sensors. The buttons or switches are typically not positioned on the mirror reflective element so as to avoid the user contacting the front surface (typically a glass surface) of the reflective element when he or she is actuating the switch or button so as to limit or reduce unsightly fingerprints and smudges on the reflective element that may occur if the user contacts with his or her finger the front surface (typically a glass surface) of the reflective element while actuating a touch-actuated switch or button. Moreover, providing a touch-sensitive front surface for the mirror reflective element may involve specialized and potentially expensive surface coatings on the front surface of the mirror reflective element (for example, a transparent conductive coating such as indium tin oxide or doped tin oxide), which can add considerable cost to the manufacture of the mirror reflective element, and so requires a specialized mirror reflective element.

Therefore, there is a need in the art for an improved mirror assembly which overcomes the shortcomings of the prior art.

SUMMARY OF THE INVENTION

The present invention provides an interior rearview mirror assembly which has one or more membrane type elements or switches and/or displays positioned at the front or viewable surface of the mirror reflective element of an interior rearview mirror assembly. The membrane type switches/displays preferably are provided in a sheet form and may be adhered or bonded or otherwise attached/secured/applied to the front surface (the surface that is directed generally toward the driver of the vehicle when the interior mirror assembly is installed in the vehicle) of the mirror assembly. Such front surface is usually a glass surface, though the present invention is also applicable to plastic mirror reflective elements, such as acrylic or polycarbonate mirror reflective elements.

According to an aspect of the present invention, an interior rearview mirror assembly for a vehicle comprises a reflective element that preferably is positioned at and partially in a bezel portion or that has a reduced bezel or generally bezel-less construction, such as a mirror assembly of the types disclosed in PCT Application No. PCT/US03/35381, filed Nov. 5, 2003 by Donnelly Corp. for ELECTRO-OPTIC REFLECTIVE ELEMENT ASSEMBLY; and/or U.S. patent application Ser. No. 11/021,065, filed Dec. 23, 2004, now U.S. Pat. No. 7,255,451, which are hereby incorporated herein by reference. The reflective element has a user input or display overlay element or membrane element positioned at and secured on a front surface (typically a glass surface) of the reflective element (the surface facing generally toward the driver of the vehicle when the mirror assembly is installed in a vehicle). The overlay element includes an electrical lead or wiring or flexible ribbon connector that is adapted for making connection to circuitry contained within the mirror assembly and behind the mirror reflective element when the mirror reflective element is mounted in the interior mirror assembly. The overlay element is preferably adhered to or bonded to or otherwise attached or secured or applied to the front surface of the mirror reflective element, and the flexible ribbon connector (preferably a flat polymer film or ribbon, such as a polyester film or ribbon with a plurality of generally parallel conductive traces established such as by screening of a conductive paste or material thereon and terminating in a multi-pin electrical connector plug or socket; and with the conductive traces or leads or paths laminated/sandwiched between plastic films so that the conductive paths are insulated both electrically and environmentally from the outside environment) wraps around the edge of the mirror reflective element from its front to rearwards of the mirror reflective element, and with the wrap-around of the flexible ribbon (with multi-conductive traces sandwiched/protected/insulated between plastic films, such as polyester films, a few thousands of inches thick) tucking in and passing between the edge of the mirror reflective element and a plastic bezel portion of the interior mirror assembly and being generally not overly discernible to a driver or occupant of the driver.

The overlay element may include one or more user inputs or buttons that are actuatable by a user pressing against the appropriate area of the overlay element (such as a blister region) and toward the reflective element to which the overlay is secured, preferably by a pressure-sensitive adhesive or by another adhesive means (for example, adhesives available from 3M Corporation of Minneapolis Minn., such as 3M™ High Performance Adhesive Transfer tapes with Adhesive 200 MP, can be used, or 3M™ Adhesive Transfer Tape—300L SE High Strength Acrylic Adhesive can be used). The rigid mirror reflective element (typically a prismatic mirror element or an electrochromic mirror cell, as known in the automotive mirror art) provides a rigid substrate to support the overlaying flexible overlay member and a solid, rigid backboard against which to press the likes of a membrane switch included in the overlay element. The switches of the overlay element are preferably push-push switches that are selected to have a switch actuation force that is sufficiently low so as not to cause or generate a torque on the pivot element or pivot elements of the support of the mirror casing of the mirror assembly sufficient to move the mirror casing from whatever position the driver has selected it to be to suit that driver's desired field of view rearward for the mirror reflective element that is disposed in the mirror casing. Preferably, the membrane switches of the user-actuatable overlay element generate a tactile feedback to a finger when pushed on so that a driver or vehicle occupant receives a tactile acknowledgment of success when pushing/pressing on the membrane switch to turn on or turn off a vehicle accessory or function via actuation by pushing on the membrane switch of the overlay element.

The overlay element may also or otherwise include one or more illumination sources (such as a light emitting diode element or electroluminescent element) that may be energized to illuminate one or more switches or display elements or icons or indicia or the like formed at or on the overlay element. Optionally, the overlay element may be positioned adjacent to or over a display region of the reflective element, such as adjacent to or over a display window etched or otherwise formed in the reflective coating of the reflective element or at a display-on-demand display/transflective region and aligned with one or more display elements or illumination sources within the mirror assembly. The overlay element may comprise a generally transparent or translucent region that may overlap or coincide with or juxtapose with or overlay the display region of the reflective element so that the display is viewable through the generally transparent or translucent region of the overlay element and through the reflective element by a driver of the vehicle (or the overlay element may have a cutout region that is positioned at and generally aligned with the display area of the reflective element).

Optionally, the user inputs and/or display elements of the present invention may be implemented at or on a reflective element of other types of mirror assemblies, and may be implemented at or on a prismatic reflective element or an electro-optic reflective element, such as an electrochromic reflective element assembly or cell, without affecting the scope of the present invention.

Optionally, the mirror assembly may have one or more cap portions which attach or secure to a rear portion of a mirror holder or reflective element assembly portion. The reflective element assembly portion preferably comprises at least a mirror reflective element and a bezel portion or the like that preferably encompasses at least a perimeter portion of the reflective element, thereby at least partially securing the reflective element in the reflective element assembly portion. The cap portion or portions may include one or more electronic accessories or circuitry to provide additional features or functions to the mirror assembly, such as described in U.S. provisional applications, Ser. No. 60/471,546, filed May 19, 2003; Ser. No. 60/525,537, filed Nov. 26, 2003; and Ser. No. 60/556,259, filed Mar. 25, 2004, and in PCT Application No. PCT/US04/15424, filed May 18, 2004, which are hereby incorporated herein by reference in their entireties. The additional features or functions may thus be back-loaded into the mirror holder after the mirror holder is formed and after the reflective element is attached at the bezel portion or front portion of the mirror holder. The cap portion may include the circuitry or a circuit board, and the flexible connector or wiring of the overlay element may attach to the circuitry as the cap portion is attached to the bezel portion or reflective element assembly.

Therefore, the present invention provides an interior rearview mirror assembly which may include one or more overlay elements or membranes, which provide one or more user inputs or buttons or switches and/or one or more illumination sources and/or one or more displays or display elements. The overlay element may include circuitry. The overlay element or membrane is positioned on the viewable surface of the reflective element so that the user inputs/illumination sources/displays are readily viewable and/or accessible by a driver or occupant of the vehicle. The overlay element or membrane may be readily adhered or applied to the front surface of the reflective element and electronically connected to the appropriate circuitry (such as to a printed circuit board or to a flex circuit within the mirror assembly), such that the overlay element or membrane provides an efficient installation of such electronic features or accessories or inputs. The overlay element or membrane may be selected to provide a desired display or input option and thus may facilitate customization or personalization of the reflective element and mirror assembly, while the other components of the mirror assembly may comprise substantially universal or common or similar components. Importantly, because the user (such as the driver of the vehicle) is touching and pressing on membrane or touch sensors included as part of the overlay element or portion and is not touching the typically glass surface of the mirror reflective element, the problems associated with fingerprints, smears and the like on the glass front surface are avoided as the surface of the overlay element can be chosen to not readily show fingerprints, smears and the like by making that surface of the overlay to be diffusive, to be matte, to be colored and/or generally to have a surface finish that is not polished or not generally spectrally reflective so as not to readily show fingerprints and the like.

Also, the overlay element and its accompanying ribbon connector (both are preferably thin, preferably having less than about 0.15 inches cross-sectional thickness, measured away from any dome membrane switch element; more preferably less than about 0.075 inches cross-sectional thickness preferably less than about 0.05 inches cross-sectional thickness) can be provided by a low-cost, membrane switch manufacturer, such as has been well established for provision of thin plastic membrane switches commonly found on appliances such as microwaves and calculators. The electrical conductors and any accompanying circuitry of the overlay element and its accompanying ribbon connector are sandwiched/disposed between plastic protective films or layers so as to be protected against the environmental elements, so as to be substantially moisture impervious, so as to be protected against physical wear and tear, and so as to be electrically insulated.

These and other objects, advantages, purposes and features of the present invention will become apparent upon review of the following specification in conjunction with the drawings.

BRIEF DESCRIPTION OF THE DRAWINGS

FIG. 10 is a front elevation of another interior rearview mirror assembly of the present invention;

FIG. 11 is a sectional view of a portion of the mirror assembly of FIG. 10, showing the attachment of the membrane to the mirror reflective element;

FIGS. 14-25 are views of other interior rearview mirror assemblies in accordance with the present invention.

DESCRIPTION OF THE PREFERRED EMBODIMENTS

Figure 1:
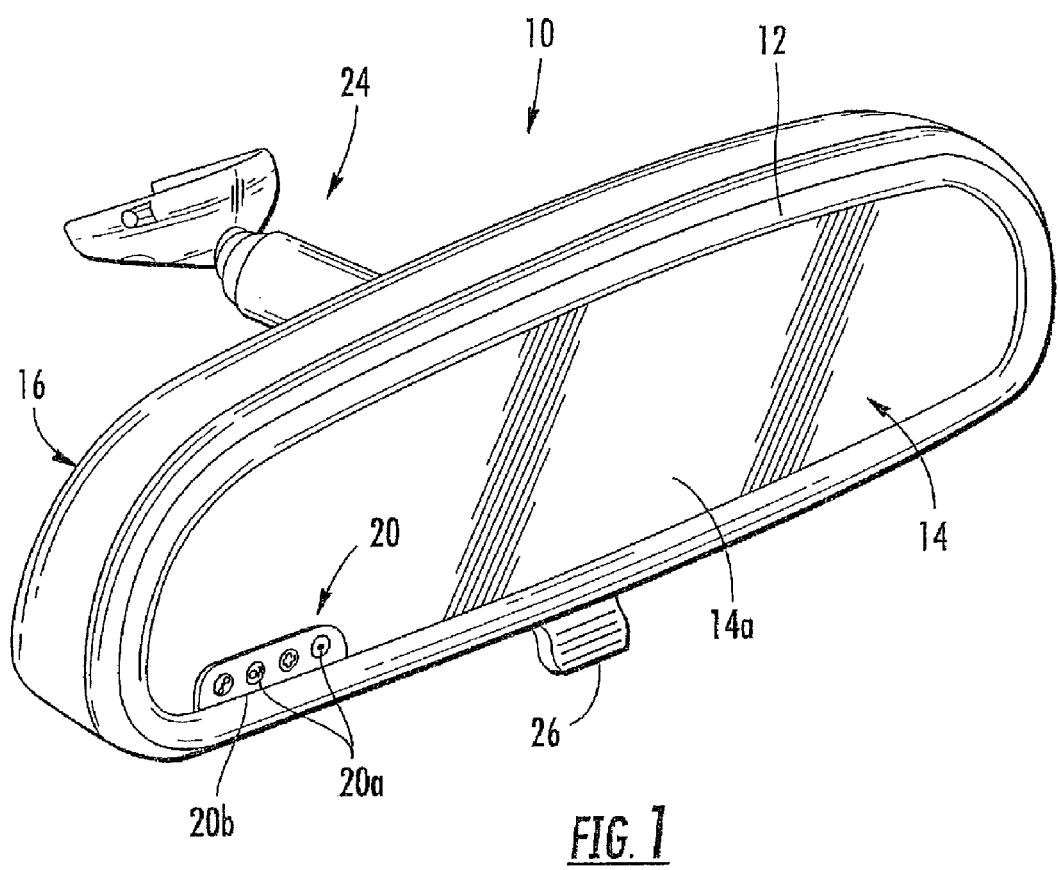
FIG. 1 is a front perspective view of an interior rearview mirror assembly in accordance with the present invention.

Referring now to the drawings and the illustrative embodiments depicted therein, an interior rearview mirror assembly 10 for a vehicle includes a bezel portion 12, a mirror reflective element 14 positioned at and at least partially within the bezel portion, and a rear casing portion 16. Mirror assembly 10 may include a printed circuit board 18 (FIG. 3) or a flex circuit having an electronic accessory or circuitry thereon or integrated therein or attached thereto. Mirror assembly 10 includes a user input overlay element or membrane or sheet 20, which is positioned at or on the front surface 14a (the surface facing generally toward the driver of the vehicle when the mirror assembly is installed in the vehicle) and operable to activate/deactivate/control one or more accessories or displays or display elements or the like, as discussed below. The overlay element or membrane 20 may be adhered or bonded or otherwise attached or secured to the front surface 14a of the reflective element 14 so that the user inputs are readily viewable and accessible by the driver or occupant of the vehicle.

Rear casing portion 16 may comprise any type of casing or housing portion for a mirror assembly, or may comprise a plastic molded cap or cap portion, such as the types described in U.S. provisional applications, Ser. No. 60/471,546, filed May 19, 2003; Ser. No. 60/525,537, filed Nov. 26, 2003; and Ser. No. 60/556,259, filed Mar. 25, 2004, and in PCT Application No. PCT/US04/15424, filed May 18, 2004, which are hereby incorporated herein by reference.

User input overlay element or membrane 20 comprises one or more membrane switches or buttons 20a, which are laminated by and substantially sealed within a plastic material or sheet (such as a polycarbonate or polyester material or the like, which may be hardcoated, such as with a UV-cured hardcoat or the like and may be UV absorbing/filtering, to reduce susceptibility to scratching) or are laminated between/sandwiched between/disposed between flexible plastic films or sheets), such that pressing against the outermost sheet of film of the overlay element at the appropriate area actuates the switch or button contacts positioned within or under the sheet or sandwiched at that particular area. Overlay element 20 preferably has less than about 0.15 inches cross-sectional thickness; more preferably less than about 0.075 inches cross-sectional thickness preferably less than about 0.05 inches cross-sectional thickness (measured at its least thick cross section).

For example, the overlay element or membrane may comprise a membrane switch that may incorporate aspects of the membrane switches commercially available from Nelson Nameplate of Los Angeles, Calif. Membrane switches are well known in the art for providing electrical switching functions in a reliable, compact package. Membrane switches typically have a flexible plastic membrane layer normally separated from a substrate by a nonconductive spacer. Openings in the spacer permit a user to push the membrane through the spacer, bringing facing electrical contacts on the internal surfaces of the membrane and substrate into contact with one another, thereby closing a switch. The natural resilience of the membrane returns the membrane to its spaced position upon removal of the actuating force. Membrane switches suitable for use in an overlay element of the present invention typically provide feedback to a user of switch actuation. Since the membrane travel to closure is small, a user receives feedback when they have actuated a switch to indicate/confirm/acknowledge that switch contact closure has occurred. Aural feedback or visual feedback (such as by illumination of an indicator light) can optionally be provided. Tactile feedback is preferably provided such as by clicker domes built into the membrane of the overlay element. A variety of membrane switching means and constructions useful for the overlay elements of the present invention are known in the art, such as are disclosed in U.S. Pat. Nos. 5,523,730; 5,660,096; 5,867,082; 5,990,772; 6,023,213; 6,069,552; 6,069,945; 6,137,387 and 6,262,646, the entire disclosures of which are fully incorporated by reference herein.

As indicated above, a membrane switch at the front of the overlay element desirably provides tactile feedback to a person pressing the overlay element at the front of the mirror reflective element. Such a tactile switch is created by adding domes to a basic membrane switch construction for the overlay element. A variety of dome types can be used. For example, polyester or stainless steel domes can be used. Tactile switches constructed with stainless steel domes have a stamped steel dome placed above each switch contact and can be customized/selected in a variety of sizes and actuating forces to suit overlay elements used for particular interior mirror assemblies. Tactile switches constructed with polyester domes can comprise domes formed into either the graphics layer or the top circuit layer of the membrane switch regions of the overlay element.

Optionally, electroluminescent (EL) backlighting can be provided for the membrane switches of the overlay element such as by printing EL phosphors between two conductive layers, with one of the conductive layers being transparent so that phosphors emit light when a DC voltage is applied to them. Fiber optic backlighting can also be utilized to offer uniform back lighting for membrane switches. Light from a light source (such as an LED located to the rear of the mirror reflective element) can be light-piped (by thin, flexible plastic fiber optic cables or strands that wrap-around the edge of the mirror reflective element to the front of the mirror reflective element) to be evenly distributed under the graphics/membrane switches at the front of the mirror reflective element.

Membrane switch means and constructions supplied by DuraSwitch Industries Inc. of Mesa, Ariz. can be used in the present invention. For example, DuraSwitch Industries Inc. supply a membrane switch under the trade name PushGate™ that provides a crisp and consistent tactile feel, is durable and reliable, is environmentally sealed, has a rapid actuation response, is available with removable graphic overlays and has full key illumination capability. Other types of membrane switch means may be incorporated, without affecting the scope of the present invention.

Preferably, the membrane switch of the overlay element of the present invention comprises magnetically-actuated pushbutton switches having a metal armature normally held spaced from switch contacts by a magnet. Such as in the magnetically-actuated pushbutton switches disclosed such as in U.S. Pat. Nos. 5,523,730, 5,666,096, 5,867,082 and 5,990,772 (the disclosures of which are incorporated herein by reference), pushing on the armature causes it to snap free of the magnet and close the switch contacts by shorting them. Release of the actuating pressure allows the magnetic force to withdraw the armature from the contacts to reopen the switch.

The switches preferably comprise a non-conductive substrate with electrical contacts formed thereon. A non-conductive spacer layer lies on the substrate with openings therein exposing the contacts. A sheet magnet overlies the spacer with the armatures underneath the magnet layer in the spacer openings. The armatures preferably have actuating buttons that protrude through apertures in the magnet layer. Preferably, the magnet layer itself is covered by a membrane or the like, the upper surface of which carries suitable graphics to aid the driver or vehicle occupant to use the overlay element of the present invention.

The membrane switch or user input overlay element may be attached to a desired area or region of the front surface 14*a* of the reflective element 14 to provide the function/feature at the mirror assembly. The overlay element or membrane may be printed or screened with the desired color or pattern of colors (or may be substantially transparent or translucent in areas where no color is printed) to provide the desired appearance for the membrane at the reflective element. Preferably, the membrane is not spectrally reflecting or polished in the areas where the inputs are located, because contact by a user in those areas may leave fingerprints or smudges which may be readily discernable if on a reflective surface (or on a transparent overlay element over a reflective surface). An organic or inorganic light-emitting diode (LED or OLED) or electroluminescent light-emitting (EL; organic or inorganic) junction or element or multiple such elements can be included in the overlay element and located at, or disposed at/behind a particular membrane switch, such that successful actuation of a vehicular accessory or feature/function can be indicated to the person pressing the membrane switch by that local LED or EL (or any other light-emitting means) indicator element illuminating (and correspondingly, when that particular switch is next pressed to turn off that vehicular accessory or feature/function, success may be indicated by the indicator light associated with that particular membrane switch turning off). The particular portion/region of the overlay element where the membrane switch is located may be formed in a contrast or distinctive color or pattern so that it is readily discernible by day.

Any associated back-lighting indicator can have relatively low light emission so that it merely causes that membrane switch region of the overlay element to glow at night and so be readily discernible to the driver or to any other occupant of the vehicle without causing any glaring of detrimental effect on the driver's night vision (even if such weak illumination is washed out during daylight, the driver can discern the membrane switch during daytime hours by its distinctive appearance and/or by the membrane switch portion having a raised or blister profile compared to the otherwise generally flat profile/surface of the general non-switch portions of the overlay element). Note, and optionally, a photo sensor control (such as via a photo transistor or photo diode or photo resistor sensor with allied electrical circuitry) can be included in the overlay element (or provided elsewhere in the mirror assembly or in the vehicle) to reduce the intensity emitted by any light-emitting indicator of the overlay element when driving under low ambient conditions such as at dusk or night (less than 200 lux or thereabouts, for example). Also, and optionally, electronic circuitry can be included in the overlay element, preferably established on polymer flexible substrates (such as PET) such as is known for use in flexible circuitry means known in the art for use in low-cost credit card sized and thin calculators and the like.

Figure 2:
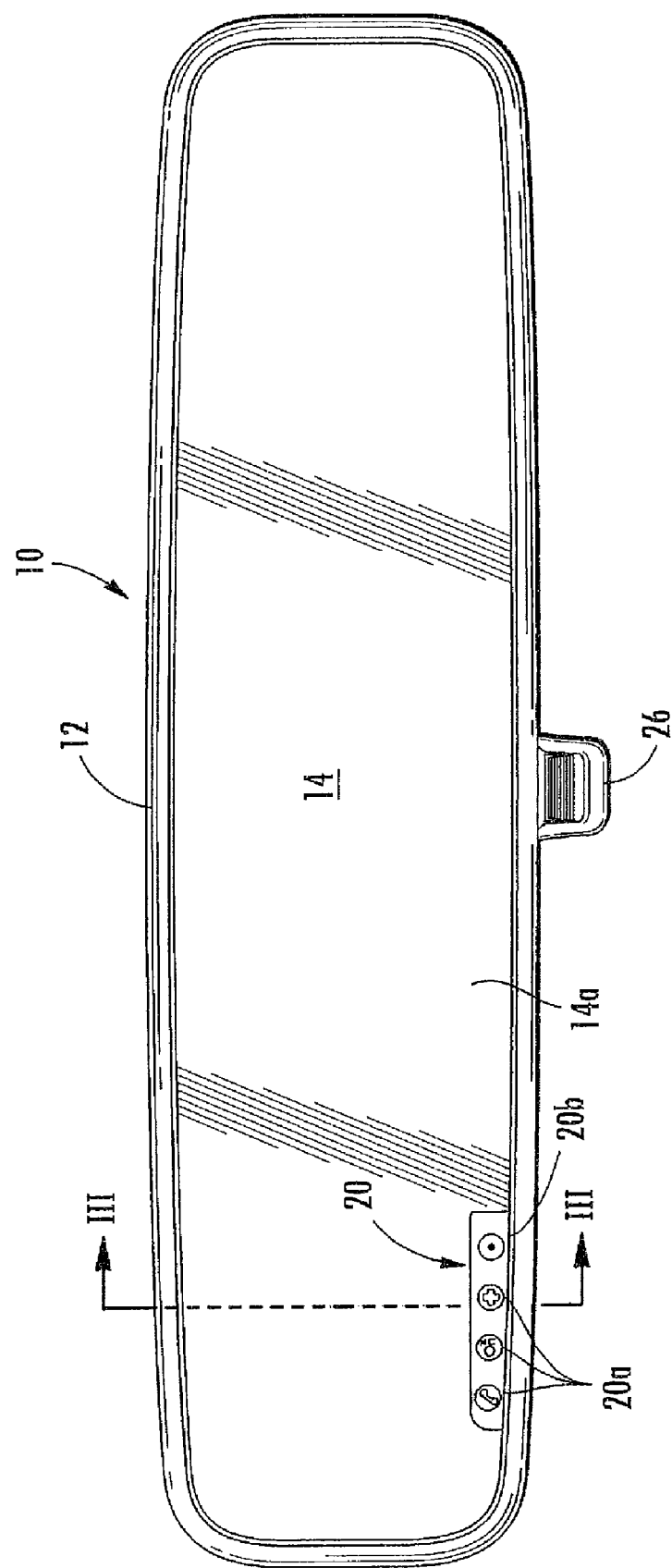
FIG. 2 is a front elevation of the interior rearview mirror assembly of FIG. 1.

In the illustrated embodiment of FIGS. 1 and 2, the overlay element 20 may comprise user inputs for a telematics system of the vehicle (such as an ONSTAR® system as found in General Motors vehicles and such as described in U.S. Pat. Nos. 4,862,594; 4,937,945; 5,131,154; 5,255,442; 5,632,092; 5,798,688; 5,971,552; 5,924,212; 6,243,003; 6,278,377; and 6,420,975; 6,477,464; and/or 6,678,614; and/or U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593; Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; Ser. No. 10/964,512, filed Oct. 13, 2004, now U.S. Pat. No. 7,308,341; and Ser. No. 10/422,378, filed Apr. 24, 2003 by Schofield for IMAGING SYSTEM FOR VEHICLE, now U.S. Pat. No. 6,946,978; and/or PCT Application No. PCT/US03/40611, filed Dec. 19, 2003 by Donnelly Corporation et al. for ACCESSORY SYSTEM FOR VEHICLE, and/or PCT Application No. PCT/US03/308877, filed Oct. 1, 2003 by Donnelly Corp. for MICROPHONE SYSTEM FOR VEHICLE, which are all hereby incorporated herein by reference), and may be positioned generally at a lower left corner of the reflective element as viewed by the driver or occupant of the vehicle. It is desirable that the edge of the overlay element that the ribbon electrical connector exits from be close to an edge of the mirror reflective element so that the flexible ribbon electrical connector (that may be less than about 0.075 inches thickness; more preferably less than about 0.05 inches thickness and most preferably less than about 0.025 inches thickness) may wrap around that edge proximate to any bezel portion and not be overly unsightly. Note that the flexible ribbon connector can be reinforced or protected at its portion that wraps-around the edge of the mirror reflective element to reduce/obviate chafing or wear between the bezel portion of the mirror casing, the wrap-around portion of the flexible ribbon connector and the mirror element caused such as by a prismatic mirror reflective element being flipped/toggled from its "day" to its "night" position during nighttime driving. Alternately, or in addition, the edges of the mirror element and/or the bezel portion local to where the flexible ribbon connector wraps around can be adapted (such as by providing a slot or depression or alcove or the like) to reduce/obviate any chafing or wear on the ribbon connector.

The overlay element may include graphics or icons or indicia or decoration or texture or demarcation that indicate the function of the membrane switch, and this may be established by printing, or silk screening or otherwise forming thereon and over the portion of the overlay element that is at or over the switch contacts. The switch contacts may be positioned within the overlay element and immediately behind or adjacent to the printed icon or indicia or the like. The switch contacts may comprise a conductive dome or blister or flexible plate or bulbous portion that may be pressed to cause the plate to flex to contact another conductive plate or member, in order to close the circuit and thus actuate the button or switch. The plates or elements may comprise a metallic material (such as stainless steel or the like) or other type of conductive material such as graphite or a conductor-coated plastic film (such as a coated polyester material or the like) so that contact of the elements may close the electrical circuit of the particular switch or button. The contacts may be formed as a dome-shaped button to provide a tactile or haptic feedback to the user of the switch, and may even provide a visual or audible feedback as well, so that the user may recognize that the switch was properly actuated.

Optionally, the inputs or switches of the membrane or overlay element may comprise other types of switches or buttons, such as touch or proximity sensing switches, such that the user may only have to lightly touch the input or approach the input with his or her finger. For example, the inputs of the overlay element or membrane may comprise touch or proximity switches of the types described in PCT Application No. PCT/US03/40611, filed Dec. 19, 2003 by Donnelly Corporation for ACCESSORY SYSTEM FOR VEHICLE; and/or U.S. Pat. Nos. 6,001,486; 6,310,611; 6,320,282; and 6,627,918; and/or U.S. patent applications, Ser. No. 09/817,874, filed Mar. 26, 2001 by Quist et al. for INTERACTIVE AUTOMOTIVE REARVISION SYSTEM, now U.S. Pat. No. 7,224,324; Ser. No. 10/956,749, filed Oct. 1, 2004 by Schofield et al. for MIRROR REFLECTIVE ELEMENT ASSEMBLY INCLUDING ELECTRONIC COMPONENT, now U.S. Pat. No. 7,446,924; Ser. No. 10/933,842, filed Sep. 3, 2004 by Kulas et al. for INTERIOR REARVIEW MIRROR ASSEMBLY, now U.S. Pat. No. 7,249,860; and/or Ser. No. 11/021,065, filed Dec. 23, 2004, now U.S. Pat. No. 7,255,451; and/or U.S. provisional application, Ser. No. 60/563,342, filed Apr. 19, 2004 by Bareman et al. for METHOD OF MANUFACTURING ELECTRO-OPTIC MIRROR CELL, which are hereby incorporated herein by reference, or the inputs may comprise other types of buttons or switches, such as those described in U.S. patent application, Ser. No. 11/029,695, filed Jan. 5, 2005, now U.S. Pat. No. 7,253,723; and/or U.S. provisional applications, Ser. No. 60/553,517, filed Mar. 16, 2004; and Ser. No. 60/535,559, filed Jan. 9, 2004, which are hereby incorporated herein by reference, or such as fabric-made position detectors, such as those described in U.S. Pat. Nos. 6,504,531; 6,501,465; 6,492,980; 6,452,479; 6,437,258; and 6,369,804, which are hereby incorporated herein by reference. For example, the inputs may comprise a touch or proximity sensor of the types commercially available from TouchSensor Technologies, LLC of Wheaton, IL. The touch or proximity sensor may be operable to generate an electric field and to detect the presence of a conductive mass entering the field. When a voltage is applied to the sensor, the sensor generates the electric field, which emanates through any dielectric material, such as plastic or the like (such as through the plastic membrane or substrate), at the sensor. When a conductive mass (such as a person's finger or the like, or metal or the like) enters the electric field, the sensor may detect a change in the field and may indicate such a detection. Other types of switches or buttons or inputs or sensors may be incorporated into the membrane or overlay element to provide the desired function, without affecting the scope of the present invention.

The overlay element or membrane may be inscribed or decorated or colored as desired to provide a desired appearance, or may be substantially transparent, with icons or indicia or the like printed or otherwise formed thereon to indicate the function of the buttons or switches. Optionally, the membrane may receive an insertable legend or card or insert that adapts the membrane for the particular application, which may allow for customization or personalization of the membrane for particular applications, such as described below. The membrane may be placed adjacent to a display region of the mirror assembly or partially or entirely over or envelop or surround a display region of the mirror assembly, whereby the display or display elements of the mirror assembly may be viewable through the reflective element and through the substantially transparent membrane, as discussed below. The overlay element or membrane may be overcoated or finished or colored or textured with a suitable or desired overcoat or finish or texture, such as a UV absorbing/filtering overcoat or an anti-glare coating or an anti-gloss coating or a matte finish or a diffuser coating or layer or the like, in order to provide the desired appearance and readability of the membrane, and so as to reduce the propensity of fingerprints or smears to be noticeable and which may be particularly important when coating a window area at a display or the like, as discussed below. Preferably, the outer surface of the overlay element has reduced specular reflectance, preferably very much reduced (less than about 1 percent specular reflectance preferred; less than about 0.5 percent more preferred and less than about 0.25 percent most preferred).

Figure 3:
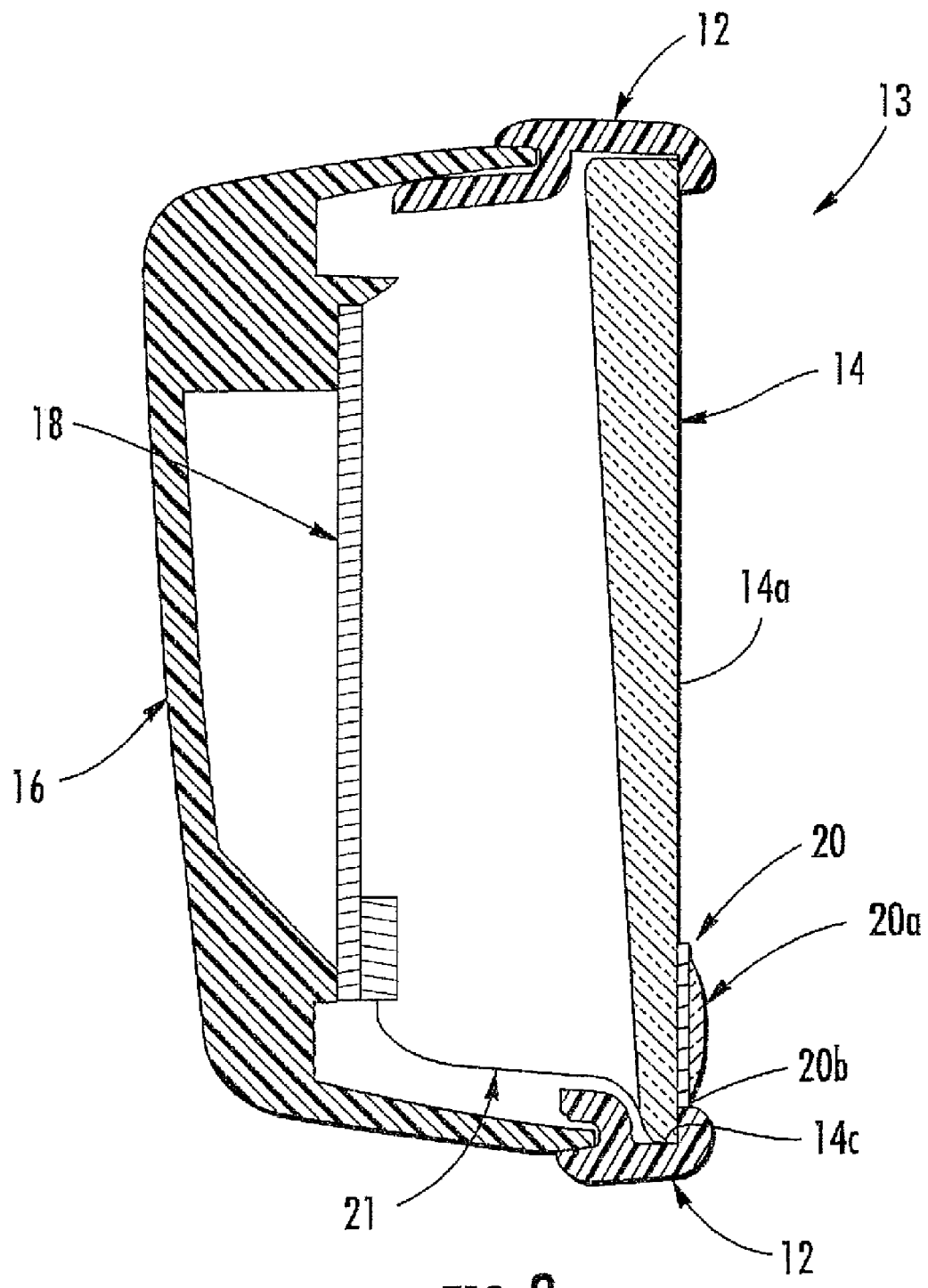
FIG. 3 is a sectional view of the mirror assembly taken generally along the line III-III in FIG. 2.

The membrane switch includes circuitry (such as silver-filled epoxy ink or paste or the like screen-printed on a flexible membrane or sheet or the like) that connects the switch contacts to a flexible cable or wiring or flex connector or tail or ribbon 21 (FIG. 3). The flex connector 21 may be routed around the edge of the reflective element (and inboard of any bezel portion of the mirror casing) to connect to a circuit board or circuitry or accessory within the mirror assembly, such as to the rear or attached to the rear of the mirror reflective element. The flex connector may comprise a plurality of conductive wires or leads or traces or elements screened onto or otherwise established on or in a thin, flexible sheet/film that is substantially flexible to allow the flex connector 21 to be routed around the edge of the reflective element to the inside of the mirror assembly for connection to circuitry or an accessory or a circuit board within the mirror assembly. The flex connector may extend from a perimeter edge portion of the overlay element or membrane 20, such as an edge 20b of the overlay element that is adjacent to or abutted against the bezel portion 12 of the mirror assembly 10, as can be seen in FIGS. 1-3.

As shown in FIG. 3, the flex connector may be routed around the outer lower perimeter edge 14c of the reflective element 14 and generally between the reflective element and the bezel portion and into the mirror casing of the assembly for connection to the circuit board 18. Optionally, the membrane may include EMC shielding, such as a conductive element such as graphite carbon or silver or the like printed on the top of the circuit or a metal foil layer, such as an aluminum foil layer or the like, added to the membrane, in order to act as a electromagnetic radiation shield for the membrane or overlay element. The shield may be grounded via a wire or conductive strip or element of the flex connector that may be connected to a ground terminal in the mirror assembly.

In the illustrated embodiment of FIG. 3, the bezel portion 12 and reflective element 14 may define a reflective element assembly 13, and may be connected or attached to a cap portion 16, such as described in U.S. provisional applications, Ser. No. 60/471,546, filed May 19, 2003; Ser. No. 60/525, 537, filed Nov. 26, 2003; and Ser. No. 60/556,259, filed Mar. 25, 2004, and in PCT Application No. PCT/US04/15424, filed May 18, 2004, which are hereby incorporated herein by reference. The reflective element assembly may be assembled by gluing or adhering or bonding or applying the overlay element to the front surface of the reflective element (such as via a pressure sensitive adhesive or tape, such as a double sided tape, or the like) at the desired area and wrapping/routing the flex connector around the adjacent perimeter edge of the reflective element so that the end of the flex connector is generally at the rear surface of the reflective element. The reflective element may then be placed in the bezel portion (such as by providing a separate formed bezel or such as by snapping the reflective element into the molded bezel portion while the bezel portion is still warm and pliable when it is fresh out of the mold and allowing the bezel portion to cool and shrink around the reflective element to retain the reflective element in the bezel portion, such as described in U.S. provisional applications, Ser. No. 60/471,546, filed May 19, 2003; Ser. No. 60/525,537, filed Nov. 26, 2003; and Ser. No. 60/556,259, filed Mar. 25, 2004, and in PCT Application No. PCT/US04/15424, filed May 18, 2004, which are hereby incorporated herein by reference), with the flex connector extending from the reflective element assembly. Optionally, the reflective element could have a notch or routing element or portion or slot at the perimeter edge for routing the flex connector around the perimeter edge of the reflective element, or the bezel portion could have a notch or slot or pocket to guide or receive the flex connector as the connector is routed around the perimeter edge of the reflective element, without affecting the scope of the present invention.

The cap portion 16 includes the printed circuit board 18 (FIG. 3) mounted therein or attached thereto, so that the flex connector 21 may be connected to the circuitry or circuit board as the cap portion is attached to the reflective element assembly. The flex connector 21 and circuit board 18 may provide a plug-in type connection to ease connection of the flex connector to the circuit board as the cap portion is moved toward and into engagement with the reflective element assembly. Optionally, the flex connector 21 may be connected to the circuit board via other connection means, such as soldering or conductive adhering or clamping or heat staking or the like of the wires or leads of the flex connector at the circuit board or circuitry of the cap portion (or elsewhere in the mirror assembly, without affecting the scope of the present invention).

Optionally, the overlay element may be provided to the mirror assembly manufacturing line already connected to the associated circuitry/accessory. For example, a HomeLink® trainable garage door opener (GDO) can be provided to the mirror assembly line connected to an overlay element (such as via detachable connection of the flexible ribbon to the circuitry of the GDO via a plug/socket connection or via direct connection of conductive traces of the flexible ribbon to corresponding conductors/traces of the printed circuit board (PCB) of the circuitry of the GDO. Note that the PCB to which the flexible electrical harness of the overlay element is connectable to or is connected to itself may be a flexible circuit wherein the various electronic circuitry is established on a plastic flexible substrate (rather than on a rigid board)). To make the mirror assembly, the assembler takes, for example, a glass prismatic mirror. Using a jig or similar aid as desired, the assembler removes a protective strip over a layer of pressure-sensitive adhesive on the back of the overlay element. He/she then presses the overlay element to adhere to a lower corner perimeter part of the front glass surface of the prismatic mirror reflective element (or elsewhere if desired or suitable or appropriate). The assembler then simply wraps the flexible ribbon (to which the GDO module is already connected) around the edge of the mirror element, attaches the bezel, attaches/secures the GDO module to the rear of the mirror reflector element or at/in a module-retaining structure of the casing of the mirror assembly, and then proceeds to complete the assembly of the interior rearview mirror assembly.

Figure 4:
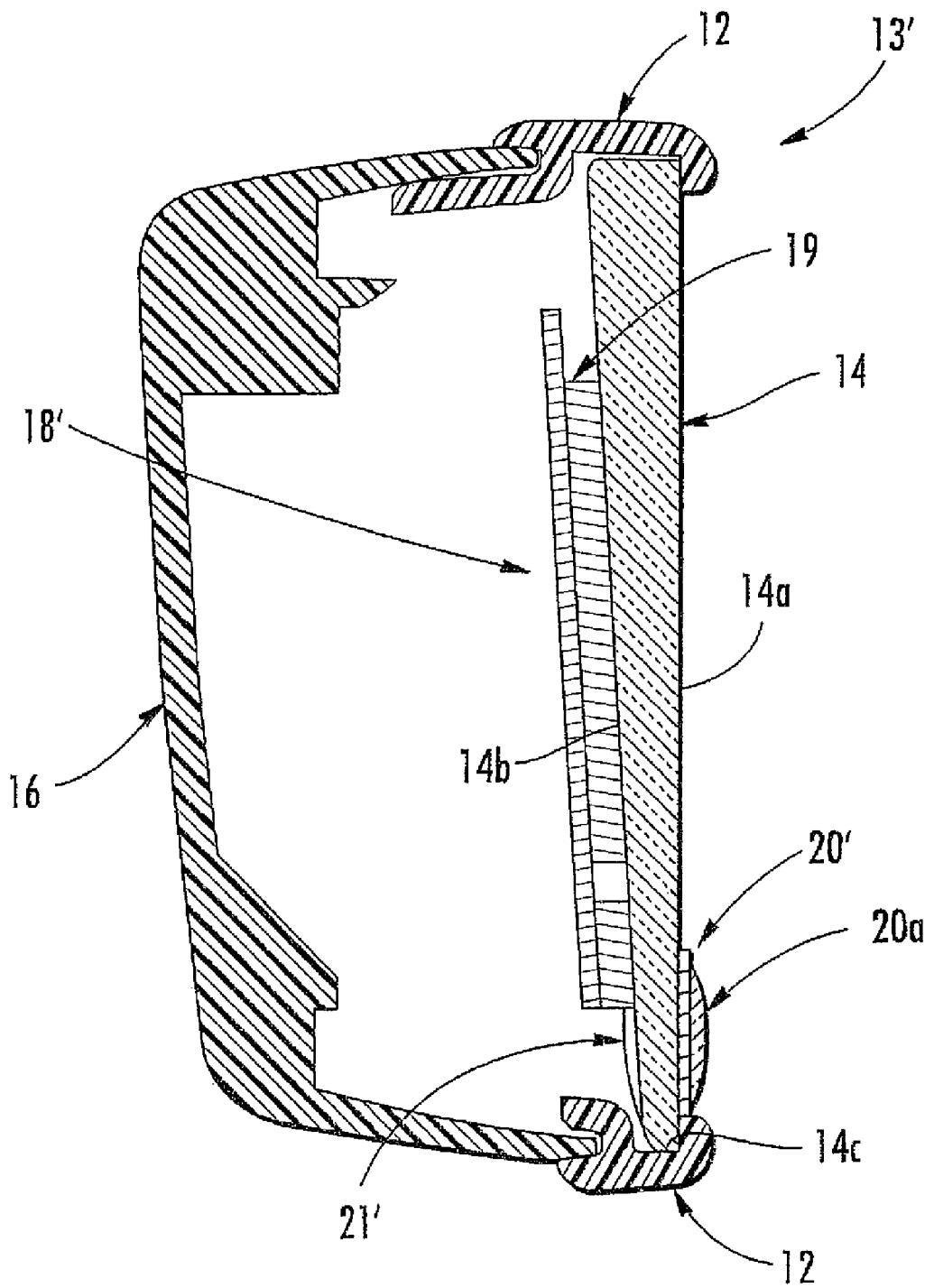
FIG. 4 is a sectional view similar to FIG. 3 of another mirror assembly of the present invention.

Optionally, and with reference to FIG. 4, a reflective element assembly 13' may include a bezel portion or mirror holder 12 and a reflective element 14, with a printed circuit board 18' attached to the rear surface 14b of the reflective element 14. The circuit board or electrical accessory 18' may be adhered to the rear surface or otherwise attached or secured to the rear surface of the reflective element, and may include a foam layer 19 or a opacifying tape of a colored/opacifying printed or screened-on layer (especially when the reflective element comprises a transflective mirror element) or the like between the circuit board and the reflective element, without affecting the scope of the present invention. Optionally, the circuitry (which may include flip-chip technology as known in the circuitry art) may be printed or screened directly onto the rear surface of the reflective element, such as by utilizing the principles described in U.S. patent application, Ser. No. 10/956,749, filed Oct. 1, 2004 by Schofield et al. for MIRROR REFLECTIVE ELEMENT ASSEMBLY INCLUDING ELECTRONIC COMPONENT, now U.S. Pat. No. 7,446,924, which is hereby incorporated herein by reference, without affecting the scope of the present invention. The flex connector 21' may extend from the overlay element or membrane 20' and may wrap around the adjacent perimeter edge 14c of the reflective element to the rear surface of the reflective element, where the flex connector may readily connect to the circuitry or circuit board at the rear surface of the reflective element, such as in the manners described above. In such an embodiment, the cap portion or rear casing portion may readily connect or attach to the reflective element assembly, without having to connect the flex connector to the circuit board as the cap portion approaches and engages the reflective element assembly.

Figure 5:
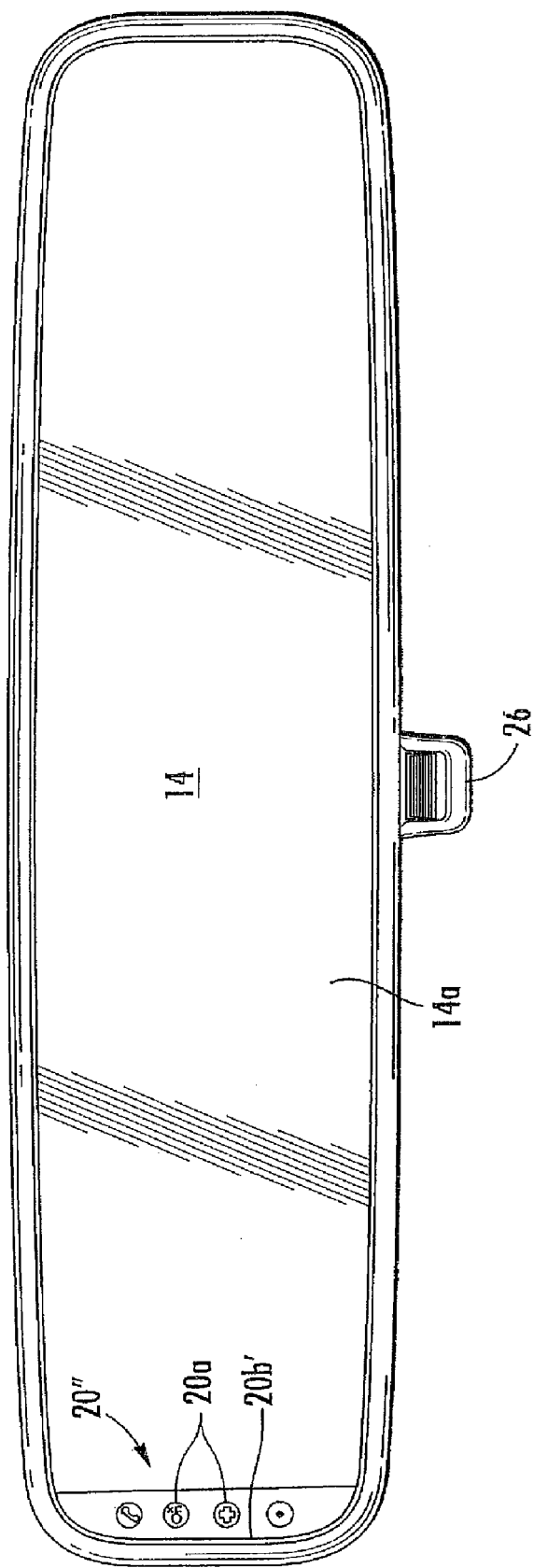
FIG. 5 is a front elevation of another interior rearview mirror assembly of the present invention.

Although shown in FIGS. 1-4 as being positioned generally at a lower left corner region of the reflective element, the overlay element or membrane may be positioned elsewhere on the front surface 14a of the reflective element 14, depending on the desired appearance or on the particular function or application, without affecting the scope of the present invention. For example, and with reference to FIG. 5, the telematics input overlay element or membrane 20" may be shaped and sized to be positioned along a side portion or region or perimeter edge of the reflective element. In such an embodiment, the flex ribbon harness or connector or wiring may extend from the side 20b' of the membrane and may wrap around the adjacent side perimeter edge of the reflective element to the circuitry or circuit board behind the reflective element and within the innards of the mirror assembly.

Optionally, the membrane or overlay element of the present invention may include one or more illumination sources, such as light emitting diodes (LEDs) or an electroluminescent (EL) element or the like. The illumination source or sources may be positioned at or behind the buttons or switches 20a and may be energized or activated when the button is actuated to provide a visible feedback or indication that the button is properly actuated. Optionally, the illumination sources may be energized or actuated to provide illumination of the buttons or switches or icons or indicia of the overlay element, such as during low light conditions, such as nighttime conditions, and may be operable in response to an ambient light sensor of the mirror assembly or of the vehicle. Optionally, the membrane may provide backlighting via other types of illumination sources, such as, for example, electroluminescent elements or panels or the like or fiber optics (which may be connected to the circuitry or circuit board of the mirror assembly and routed around the adjacent perimeter edge of the reflective element with the flex connector) or the like, without affecting the scope of the present invention. The cover layer or surface of the adhesively-backed overlay element may be at least partially translucent/transparent to allow light or illumination from the illumination source or sources to be viewable therethrough, such that the illumination source may backlight a respective button or switch or icon or indicia or the like.

In the illustrated embodiment, reflective element 14 comprises a prismatic reflective element having a wedge-shaped prism with a reflective coating on its rear surface, such as the types of reflective elements described in U.S. Pat. Nos. 6,318, 870; 5,327,288; 4,948,242; 4,826,289; 4,436,371; and 4,435, 042; and/or U.S. patent applications, Ser. No. 10/709,434, filed May 5, 2004 by Lynam for MIRROR REFLECTIVE ELEMENT, now U.S. Pat. No. 7,420 756; and/or Ser. No. 10/993,302, filed Nov. 19, 2004, now U.S. Pat. No. 7,338, 177; and/or U.S. provisional application, Ser. No. 60/525, 952, filed Nov. 26, 2003 by Lynam for MIRROR REFLECTIVE ELEMENT FOR A VEHICLE, which are all hereby incorporated herein by reference. The interior rearview mirror assembly 10 may include a toggle assembly (not shown) and a mounting portion 24, which may be pivotally connected to the toggle assembly and mounted to the vehicle to provide pivotal movement of the reflective element relative to the vehicle. The toggle assembly may include a toggle member 26, which may be actuated or moved by a user to adjust the reflective element relative to the vehicle. The toggle assembly may also include a pivot joint or pivot element, such as a socket and/or ball member, molded or formed thereon or attached or mounted thereto, in order to provide pivotal movement or adjustment of the mirror assembly relative to the mounting arm or portion. The mounting portion 24 may be mounted to the vehicle, such as to an interior surface of the vehicle windshield or to a header portion of the vehicle or the like, via any mounting arm and button or any other mounting arrangement or construction, such as the types disclosed in U.S. Pat. Nos. 6,499,850; 6,318,870; 6,315,421; 6,227,675; 5,671,996; 5,813,745; 5,673,994; 5,820,097; 5,708,410; 5,680,263; 5;582,383; 5,576,687; 5,555,136; 5,521,760; 5,330,149; 5,100,095; 5,058,851; 4,930,742; 4,936,533; 4,436,371; 4,524,941; 4,435,042; and/or 4,646,210; and/or PCT Publication No. WO 03/095269 A2, published Nov. 20, 2003 for REARVIEW MIRROR ASSEMBLIES; and/or PCT Publication No. WO 03/099614 A1, published Dec. 4, 2003 for MODULAR REARVIEW MIRROR ASSEMBLY; and/or PCT Application No. PCT/US04/15424, filed May 18, 2004 by Donnelly Corp. et al. for MIRROR ASSEMBLY FOR VEHICLE; and/or U.S. patent application, Ser. No. 10/933,842, filed Sep. 3, 2004 by Kulas et al. for INTERIOR REARVIEW MIRROR ASSEMBLY, now U.S. Pat. No. 7,249,860, which are hereby incorporated by reference herein, without affecting the scope of the present invention. Optionally, the mirror assembly may be mounted to the vehicle portion (such as to the windshield or headliner of the vehicle) via a substantially plastic or all plastic double ball mounting arrangement, such as described in U.S. Pat. No. 6,318,870 and/or U.S. patent application, Ser. No. 10/032,401, filed Dec. 20, 2001 by March et al. for INTERIOR REARVIEW MIRROR ASSEMBLY WITH POLYMERIC COMPONENTS, now U.S. Pat. No. 6,877,709, which are hereby incorporated herein by reference. The mounting arrangement may he configured to provide for wiring to the mirror assembly through the mounting arrangement and to or into the mirror assembly, without affecting the scope of the present invention. Optionally, the mirror assembly may provide or include an automatic flip prismatic reflective element, such as described in U.S. Pat. Nos. 6,717,712; 6,568,414; and/or 6,382,806, which are hereby incorporated herein by reference.

Optionally, reflective element 14 may include one or more displays which may be laser-etched or otherwise formed thereon, such as via an appliqué or the like on the surface of the reflective element or such as a display on demand type of display (discussed below). The display may include one or more display elements, such as illumination sources, such as vacuum fluorescent (VF) elements, liquid crystal displays (LCDs), light emitting diodes (LEDs), such as inorganic LEDs or organic light emitting diodes (OLEDs), electroluminescent (EL) elements or the like. A substantially transparent portion or a cut-out portion of the overlay element (a window in the overlay element) may coincide with or surround/envelop a display region of the reflective element and/or a back-lit portion of the reflective element so that actuation of a membrane switch of the overlay portion can be readily and cognitively associated with the operation/function of the particular display or the like that the overlay element envelops. Optionally, the prismatic reflective element may comprise a display on demand or transflective prismatic element (such as described in PCT Application No. PCT/US03/29776, filed Sep. 19, 2003 by Donnelly Corp. et al. for MIRROR REFLECTIVE ELEMENT ASSEMBLY; and/or U.S. patent application Ser. No. 10/993,302, filed Nov. 19, 2004, now U.S. Pat. No. 7,338,177; and/or U.S. provisional application Ser. No. 60/525,952, filed Nov. 26, 2003 by Lynam for MIRROR REFLECTIVE ELEMENT FOR A VEHICLE, which are all hereby incorporated herein by reference) so that the displays are viewable through the reflective element, while the display area still functions to substantially reflect light, in order to provide a generally uniform prismatic reflective element even in the areas that have display elements positioned behind the reflective element.

Figure 6:
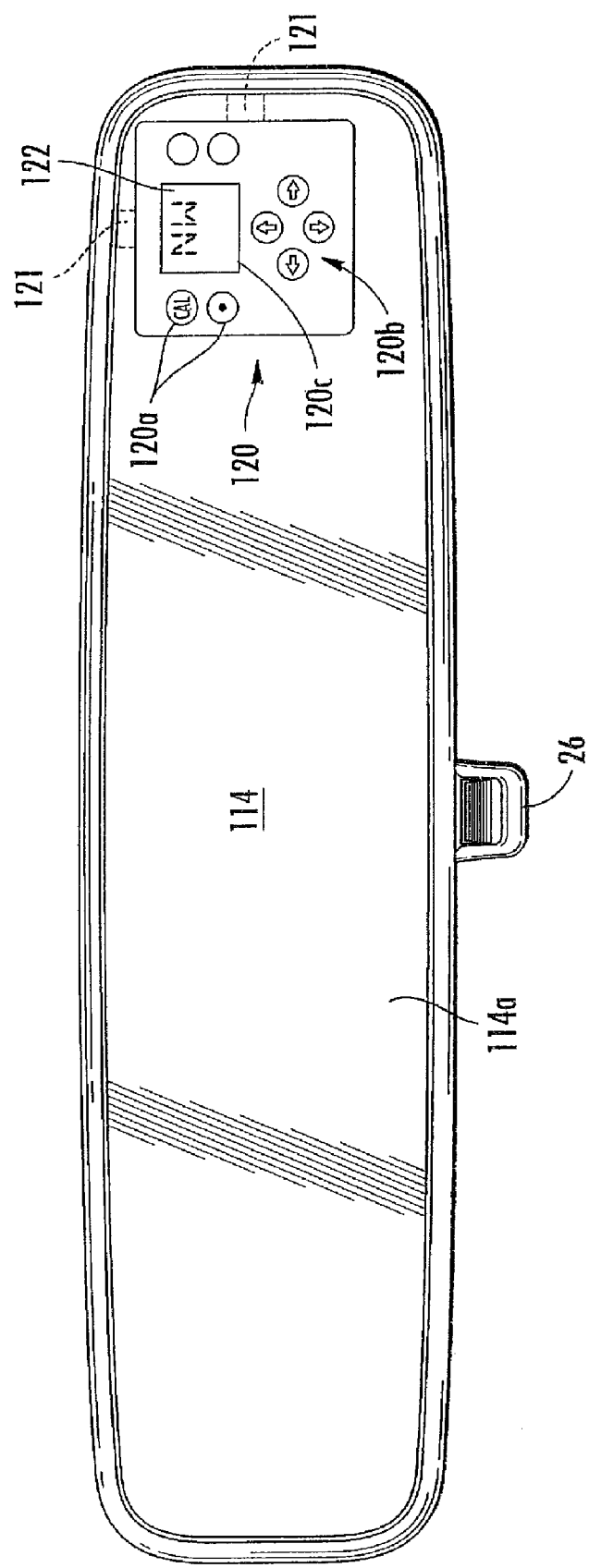
FIG. 6 is a front elevation of another interior rearview mirror assembly of the present invention.

Optionally, the overlay element or membrane of the present invention may be positioned at least partially over a display area of the reflective element, and may be substantially transparent in the overlapping area, such that the display or display element or illumination source may be viewable through the reflective element and the substantially transparent portion of the membrane. For example, and with reference to FIG. 6, an overlay element or membrane 120 may be placed on or adhered or bonded or applied to a front surface 114a of a reflective element 114, and may provide one or more user inputs 120a, 120b for actuating/deactuating, controlling and/or adjusting an accessory or display of the mirror assembly or vehicle. In the illustrated embodiment of FIG. 6, overlay element or membrane 120 may include a substantially transparent window or portion 120c, which may be positioned generally over or aligned with a display window 122 that is etched or otherwise formed in and through the reflective coating of the reflective element (or where a display or display element is positioned behind a transflective reflective element as described above), such that the display or display element is viewable through the reflective element and through the transparent portion 120c of the overlay element or membrane 120. Optionally, the overlay element or membrane may have a window cut or formed therein, such that the opening or window is positioned at or generally aligned with the display area of the reflective element.

The inputs 120a, 120b may be positioned around or adjacent the display window and may function to control or actuate/deactuate the display. For example, the display may comprise a compass display and/or a temperature display or the like, and the inputs 120a may function to actuate a calibration mode of the compass system or may activate/deactivate the compass display. The overlay element or membrane 120 may also include inputs or buttons 120b that may provide other features or controls, such as menu controls to scroll through menu information shown at the display or other types of controls or features. Other inputs or buttons may be provided for other functions and may control or adjust other displays or accessories or the like, without affecting the scope of the present invention. The overlay element or membrane may be decorated and/or colored or may have a design printed thereon in the areas surrounding or around the transparent portion or window, or the membrane may be substantially transparent over its entire area, except where icons or the like may be printed or otherwise formed on the inputs or buttons or switches. It is desirable that at least the buttons or switches are not substantially spectrally reflecting, in order to provide a non-reflecting appearance to the buttons or switches such that any fingerprints or the like on the buttons will not be readily viewable by a driver or occupant of the vehicle. Although shown as being spaced from the upper and side perimeter edges of the reflective element, the overlay element or membrane 120 preferably is positioned at or substantially near one of the perimeter edges so that the flex ribbon harness/connector 121 (shown in phantom at both the upper edge and the side edge, but only one would typically be used) may not be overly viewable by a driver or occupant of the vehicle.

Figure 7:
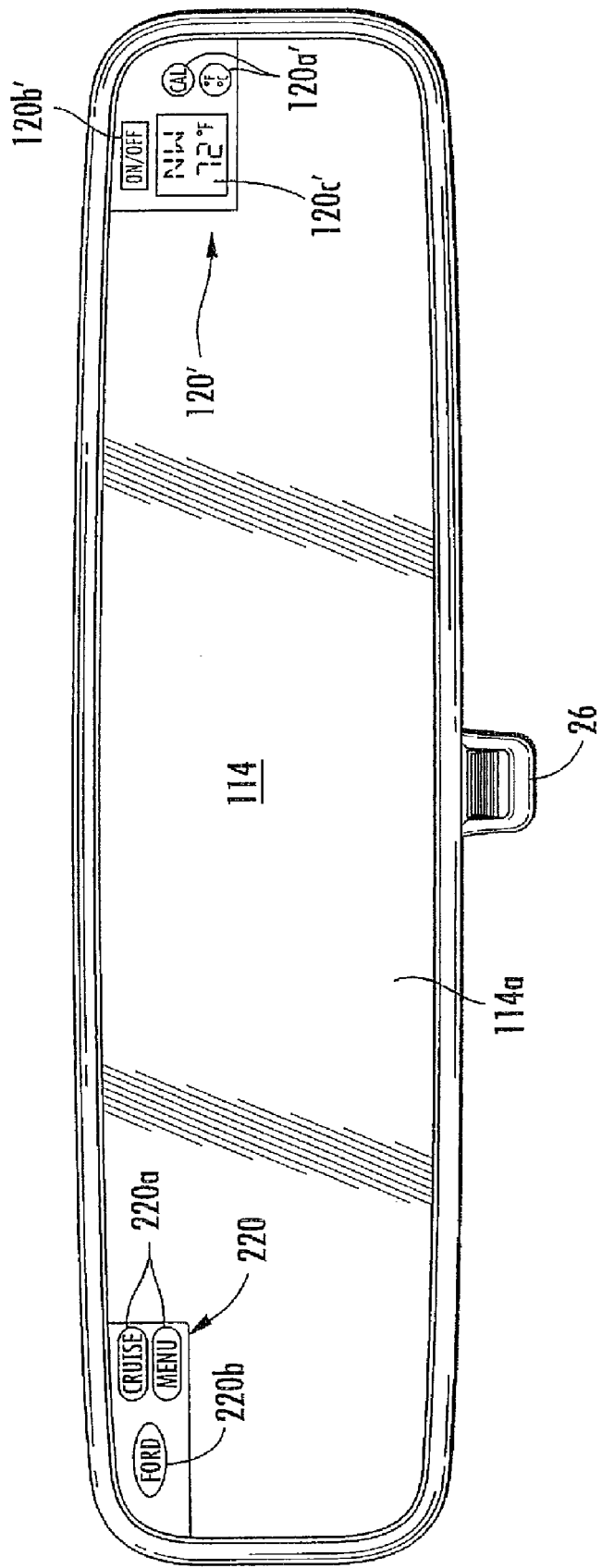
FIG. 7 is a front elevation of another interior rearview mirror assembly of the present invention.

Optionally, and with reference to FIG. 7, an overlay element or membrane 120' may be applied to the front surface 114a of reflective element 114. Overlay element or membrane 120' may include one or more inputs or buttons 120a', 120b' and may include a low profile display or display element 120c' incorporated into the membrane 120'. The display 120c' may comprise a low profile liquid crystal display (LCD) or light emitting diodes (LEDs) or organic light emitting diodes (OLEDs) or vacuum fluorescent displays (VFDs) or the like, and may be powered controlled by circuitry within the mirror assembly (or within the overlay element itself) and by the user inputs 120a', 120b' of the membrane 120'. For example, the display 120c' may function to display a directional heading and/or a temperature (such as in response to a signal from a compass system and a temperature sensor, respectively, positioned in the mirror assembly or elsewhere in the vehicle), while the user inputs 120a' may function to actuate a calibration function of the compass system or to toggle the temperature display between degrees Fahrenheit and degrees Celsius. Another input or button 120b' may function to activate or deactivate the display 120c'. The display areas of the overlay element or membrane may be overcoated or finished to provide a desired appearance or finish or texture to the membrane. For example, an LED display area may have a velvet texture or matte finish thereon, or an LCD display area may have an anti-glare coating or gloss coating thereon, in order to provide the desired readability of the display, depending on the distance between the display and the overlay element (if the display is positioned behind the overlay element).

The overlay element or membrane thus may provide a display and one or more inputs, and may be self-illuminating to illuminate or backlight an icon or indicia and/or one or more of the inputs. The display may be incorporated into the membrane or may be cognitively associated therewith, such as by placing the overlay element or membrane adjacent to the display or around the display, such that the membrane may frame or partially frame the display area. Although shown and described as displaying directional heading information and/or temperature information, clearly the display or display elements described above may be operable to display other vehicle information or accessory status information or the like, without affecting the scope of the present invention. For example, the display and inputs may be associated with a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 6,690,268; 6,672,744; 6,386,742; and 6,124,886, and/or U.S. patent application Ser. No. 10/739,766, filed Dec. 18, 2003 by DeLine et al. for MODULAR REARVIEW MIRROR ASSEMBLY, now U.S. Pat. No. 6,877,888; and/or Ser. No. 10/355,454, filed Jan. 31, 2003 by Schofield et al. for VEHICLE ACCESSORY MODULE, now U.S. Pat. No. 6,824,281, and/or PCT Application No. PCT/US03/03012, filed Jan. 31, 2003 by Donnelly Corporation for VEHICLE ACCESSORY MODULE, and/or PCT Application No. PCT/US03/40611, filed Dec. 19, 2003 by Donnelly Corporation for ACCESSORY SYSTEM FOR VEHICLE, and/or PCT Application No. PCT/US04/15424, filed May 18, 2004 by Donnelly Corporation et al. for MIRROR ASSEMBLY FOR VEHICLE, which are hereby incorporated herein by reference.

Optionally, and with further reference to FIG. 7, a membrane or overlay element 220 may include user inputs 220a for activating or controlling an accessory or menu or display or the like, such as for activating/deactivating a cruise control of the vehicle or any other accessory or system of the vehicle or the like. The membrane or overlay element 220 may also include a logo or indicia 220b, such as the vehicle manufacturer logo or other logo or indicia that may be desired. The logo or indicia 220b may be a raised element on the overlay element or membrane to stand out from the base or cover of the membrane, and/or may be backlit or illuminated by an illumination source, such as an LED or fiber optic or the like, such as described above. The illumination source may be incorporated into the membrane or overlay element 220 or may be within the mirror assembly and behind the reflective element. In applications where the illumination source is behind the reflective element, the reflective element may have a window or port formed in the reflective element such that illumination from the illumination source may project through the port to backlight the icon or indicia or logo 220b, which may be positioned generally over and aligned with the port or window, or the reflective element may comprise a transflective reflective element as described above.

Optionally, the display overlay element or membrane may provide a graphic depiction of any desired image, such as a logo of the vehicle manufacturer or other desired image. For example, the overlay element may include the logo or the like printed or formed thereon. The overlay element may be backlit or illuminated, whereby the overlay element may have a substantially transparent or translucent portion that is positioned over an illumination source (such as an LED or fiber optic or the like), or that is positioned at a window or port etched (such as by laser etching or ablation or by sandblasting or the like) or otherwise formed in the reflective element, with an illumination source or LED positioned behind the reflective element and generally aligned with the port. The overlay element thus may provide a personalization function such as the letters "FORD" or other letters or characters or patterns similar to the design or designs indicative of the manufacturer, such as the Chevrolet "bowtie" or the like. Optionally, other designs or patterns or text or logos or indicia or the like may be provided as personalization at the overlay element to provide a desired image or logo that may be indicative of other vehicle manufacturers or entities or sponsors or indicia or trademarks or emblems or signature items, or representations of a certain political views, religious beliefs, tribal affiliations, community ties, collegiate affiliations, allegiances and/or advocacy (such as, for example, a "peace" sign or other symbol or text or the like) or other views, affiliations, beliefs, etc., without affecting the scope of the present invention.

The desired image or icon or indicia or logo may be indicative of the vehicle manufacturer, or may be selected by the user or vehicle owner to provide a customized interior rearview mirror assembly, without affecting the scope of the present invention. For example, a person may select an overlay element with the logo or mascot of their alma mater to customize the mirror assembly for that particular person or owner. The customized or selected overlay element may be positioned at a port of the reflective element or may include the illumination source so as to be positionable anywhere at the reflective element, without affecting the scope of the present invention. Optionally, the light source or indicator positioned at the circuit board behind the port (or the light source or indicator incorporated into the overlay element)

may be selected to match the color that may be typically associated with the selected logo, such as a green or red or blue indicator or light emitting diode or the like for the school color or the like.

Optionally, a substantially common or substantially universal overlay element (which may provide the desired or appropriate inputs and features) may receive a selected or custom logo or insert (such as within a pocket formed in the overlay element) that may be selected by the consumer or by the manufacturer of the vehicle in which the mirror assembly will be installed. The insert may be inserted into the overlay element to customize or personalize the overlay element for the particular application or selection, such that a person may select a desired design or logo or the like to customize or personalize the mirror assembly of their vehicle. The present invention thus provides common circuitry and overlay elements, but allows for personalization or customization of the appearance of the overlay element, with no changes being required to the mirror assembly or to the overlay element itself. Other forms of customized logos or indicia or the like may be provided, without affecting the scope of the present invention.

Figure 8:
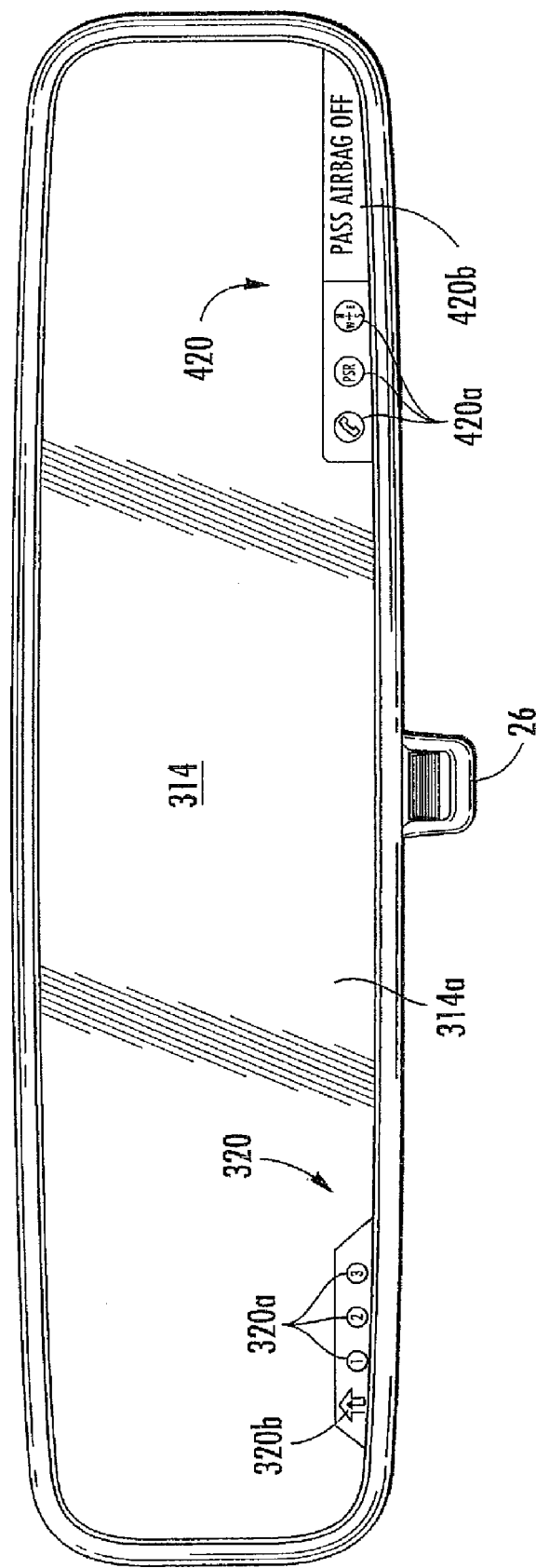
FIG. 8 is a front elevation of another interior rearview mirror assembly of the present invention.

Optionally, and with reference to FIG. 8, an overlay element or membrane 320 may be applied to a front surface 314a of a reflective element 314, and may be associated with a garage door opening system. The overlay element 320 may include one or more inputs or buttons 320a to actuate or control the garage door opening system, such as to actuate a garage door opener mechanism to open or close a garage door, such as utilizing the principles disclosed in U.S. Pat. Nos. 6,396,408; 6,362,771; 5,798,688 and 5,479,155; and/or U.S. patent application Ser. No. 10/770,736, filed Feb. 3, 2004 by Baumgardner et al. for GARAGE DOOR OPENING SYSTEM FOR VEHICLE, now U.S. Pat. No. 7,023,322, which are hereby incorporated herein by reference. The overlay element 320 may include an icon or indicia or display 320b (such as a HomeLink® icon or other icon or indicia indicative of such a system or of its manufacturer such as JCI or Johnson Controls Inc.) and may include an illumination source behind the icon or indicia, in order to illuminate or backlight the icon or indicia, such as might be useful as an indicator to assist a user when training or operating in a learning mode of a trainable garage door opener (such as by intermittently illuminating or modulating/flashing/blinking an LED or the like behind a HomeLink® icon or the like when in the learning mode) and/or as an indicator for company brand promotion/feature illustration promotion, such as by constantly illuminating the LED or the like, such as when a trainable garage door opener is not in the training or learning mode. Optionally, the HomeLink® icon may be illuminated by the LED or by an electroluminescent phosphor or the like whenever one of the other inputs or buttons of the membrane is actuated or depressed. The membrane 320 may have an illumination source (such as a light emitting diode or the like) that may be activated or energized to back light or otherwise illuminate the display as desired (or the membrane may be positioned over a port or window in the reflective element with an illumination source behind the reflective element as described above).

Optionally, and with further reference to FIG. 8, a membrane or overlay element 420 may be applied to the front surface 314a of the reflective element 314, and may provide one or more inputs or buttons 420a and a display element 420b (such as a low-profile liquid crystal display, preferably back-lit with an EL panel or low-profile OLED display, preferably back-lit with an EL or a fiber-optic illuminator). The inputs 420a may function to control or select the information being displayed by the display 420b. For example, if a user selects a "compass" input, the display 420b may display the directional heading of the vehicle, while if the user selects a "PSIR" input, the display may display the status of a passenger side air bag or inflatable restraint. As described above, the inputs may be backlit or illuminated by one or more illumination sources positioned within the overlay element or within the mirror assembly and viewable through the reflective element. Optionally, the overlay element or membrane may only include inputs as described above, and may be positioned adjacent to a display or display window of the mirror assembly, whereby the inputs may control or select the information being displayed by the display of the mirror assembly. Other inputs or controls or buttons or switches may be provided with other types of displays (either displays of the overlay element or membrane or displays of the mirror assembly), without affecting the scope of the present invention.

Optionally, and with reference to FIGS. 10 and 11, a flexible or membrane switch or overlay element or membrane or attachable keypad 620 may be applied to a front surface 614a of a reflective element 614 (which may comprise a prismatic or electrochromic reflective element or the like), and may be associated with a vehicular accessory or system, such as a garage door opening system. The overlay element 620 may include one or more user actuatable inputs or buttons or dome switches 620a on a flexible substrate or overlay element to actuate or control the garage door opening system, such as to actuate a vehicle-based wireless (RF) transmitter (preferably located to the rear of the reflective element 614 and disposed within the mirror casing 613) to actuate a garage door opener mechanism in a household garage or the like to open or close a garage door, such as discussed above with respect to membrane 320. The overlay element 620 may include an icon or indicia or display 620b (such as a HomeLink® icon or other icon or indicia indicative of such a system or of its manufacturer such as JCI or Johnson Controls Inc. of Milwaukee, Wis.) and may include an electroluminescent element or illumination source 620c behind the icon or indicia, in order to illuminate or backlight the icon or indicia, such as might be useful as an indicator to assist a user when training or operating in a learning mode of a trainable garage door opener (such as by intermittently illuminating or modulating/flashing/blinking an LED or the like behind a HomeLink® icon or the like when in the learning mode) and/or as an indicator for company brand promotion/feature illustration promotion, such as by constantly illuminating the LED or the like, such as when a trainable garage door opener is not in the training or learning mode. The overlay element 620 may have an illumination source (such as a light emitting diode or the like) that may be activated or energized to back light or otherwise illuminate the membrane and/or inputs as desired (or the membrane may be positioned over a port or window in the reflective element with an illumination source behind the reflective element as described above). Optionally, any one or all of the inputs may be illuminated.

As shown in FIG. 10, the overlay element 620 is formed to be positioned at the lower corner of the mirror assembly 610 and below a mid-line 610a of the mirror assembly 610, and thus at a lower region of the mirror assembly and toward the floor of the vehicle from the mid-line 610a when the mirror assembly is normally mounted and used in a vehicle. A corner region 620d of overlay element 620 may be curved or formed or shaped or radiused or dimensioned to generally correspond with the curve or form or radiused portion 612b of the bezel or frame 612 of the mirror assembly. The opposite corner region 620e of the overlay element 620 may also be curved or formed to provide a generally symmetrical appearance to the overlay element 620 across its diagonal. As shown in FIG. 11, the overlay element 620 may be adhered or bonded to the front surface 614a of the reflective element 614, such as via an adhesive layer 622, preferably a self-adhesive/pressure sensitive adhesive layer (or tape or other suitable adhesive or attachment means or the like) disposed between the overlay element 620 and the front surface 614a of the reflective element. The electrical cable or ribbon or electrical conducting elements 621 (such as a flexible multi-track ribbon cable with silver printed traces or tracks) may be routed below the reflective element 614 and between the reflective element and the bezel 612, and may include an electrical connector 621b (such as a plug or socket or the like) n as shown in FIG. 11.

Figure 12:
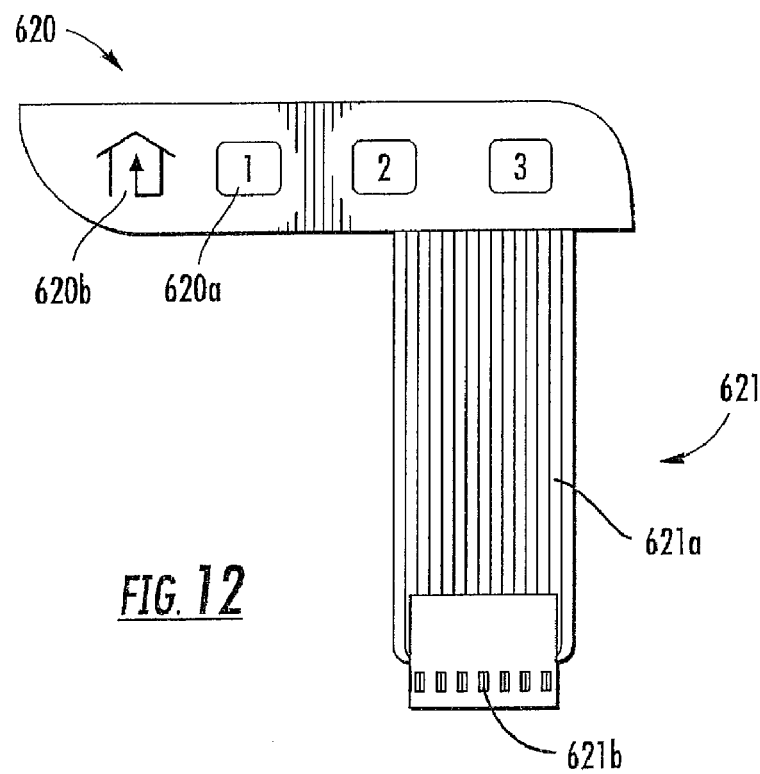
FIG. 12 is a front elevation of a membrane switch of the present invention.
Figure 13:
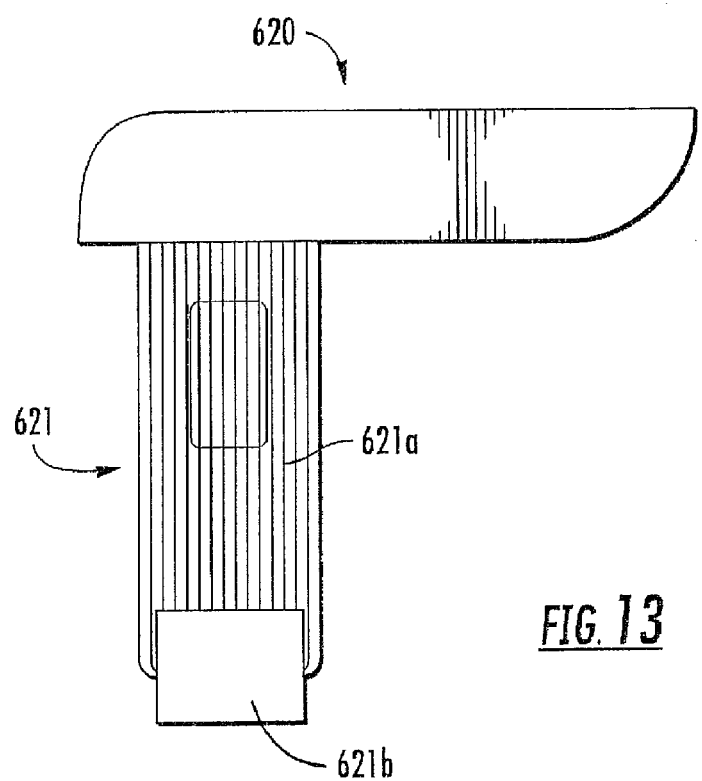
FIG. 13 is a rear elevation of the membrane switch of FIG. 12.

As can be seen with reference to FIGS. 12 and 13, the electrical conducting elements 621 of membrane 620 may comprise multiple strips or tracks (generally parallel and spaced one from another) of conducting elements 621a (such as silver printed tracks or the like), such as six tracks of conducting elements disposed along a ribbon and separated by a non-conducting ribbon material. The conducting elements may terminate at a connector 621b, such as a multi-pin connector, such as a multi-pin plug or socket or the like, and may electrically connect to the corresponding connector or connecting elements at the circuitry or printed circuit board within the mirror assembly. For example, the silver printed tracks may be disposed on a thin Mylar sheet and another thin Mylar sheet may be laminated to the first sheet to laminate the thin Mylar sheets together with the silver printed tracks between the sheets.

Preferably, the flexible membrane or substrate is formed or colored to be a dark color, such as black or blue or the like, and the adhesive layer is also colored to generally match the color of the membrane or substrate, and also to match the color of the frit portion of the membrane that is visible to the user. The background color of the membrane or substrate, particularly along the perimeter edges of the membrane or substrate, thus may substantially match the adhesive color. The darker and/or generally matching colors provide a blending of the colors so that different colors are not readily discernible when viewed at an angle relative to the mirror reflective element and when an angled reflection of the membrane and adhesive may be visible. Such angled reflections of the edges of the membrane and adhesive layer may be viewable when a user views the membrane and reflective element from a direction that is at an angle to the reflective element (or a direction that is not generally normal to the reflective element). By providing darker colors and generally matching colors for the membrane and the adhesive layer, the membrane and its reflections in the mirror reflective element generally blend together to provide a substantially homogeneous color and aesthetically pleasing appearance. Optionally, the selected colors of the membrane and adhesive may match or contrast the color of the bezel of the mirror assembly. Preferably, the viewable surface of the membrane comprises a non-reflecting, low gloss surface or absorbing surface, to further enhance the appearance of the membrane and mirror assembly, to minimize showing of finger prints and the like.

Preferably, the membrane is positioned flush with or abutted against the bezel portion so that the reflective element is not viewable behind the membrane and between the membrane and the bezel, thereby enhancing the appearance of the mirror assembly. By so abutting the membrane and the bezel portion it is adjacent to, the driver perceives that the membrane is an integral part of the mirror bezel/housing and is substantially unaware that the membrane is an add-on to the front glass surface of the mirror reflector. Also, because the bezel 612 extends proud of the membrane, any propensity of the driver to notice that the electrical connecting ribbon cable is tucked under the reflective element is further reduced and minimized. Optionally, the reflective element, in the portion or region at which the membrane is positioned, may be colored or non-reflective, such as by utilizing the principles disclosed in U.S. Pat. No. 5,066,112, which is hereby incorporated herein by reference.

As described above, the membrane 620 and inputs 620a may be operable to actuate a garage door opening system, such as a system utilizing principles of the systems described in U.S. Pat. Nos. 6,396,408; 6,362,771; 5,798,688 and 5,479,155; and/or U.S. patent application Ser. No. 10/770,736, filed Feb. 3, 2004 by Baumgardner et al. for GARAGE DOOR OPENING SYSTEM FOR VEHICLE, now U.S. Pat. No. 7,023,322, which are hereby incorporated herein by reference. Optionally, the membrane 620 (or other input at the mirror assembly, such as a conventional switch or input or button) may be actuated or accessed to input a code or identification number (or alpha-numeric code or the like) to the vehicle-based garage door opening transmitter of the vehicle, so that the vehicle-based transmitter broadcasts a garage door opening system frequency with the code superimposed/modulated thereon. Such a code is provided with the hand-held garage door opening transmitter/remote control provided for and with a garage door opening mechanism that is purchased and installed in a person's garage and that opens the garage door in response to receiving the appropriate signal, such as from the vehicle transmitter or from the remote hand held actuator that may be sold with the garage door opening mechanism. The garage door opening mechanism may include a receiver that receives the signals and recognizes the appropriate or corresponding code. For example, a vehicle owner can take his or her hand held garage remote to the vehicle, remove its cover, and view the disposition of a set of dipswitches that typically are arranged in a row (such as eight in a row or ten in a row or fifteen in a row or the like) and that are up or down to signify a binary multi-bit code that identifies that particular hand held remote that is associated with the particular garage door opening mechanism it was sold with or is intended to accompany/open.

Optionally, the user inputs 620a of the membrane 620 may be used to enter the binary codes. For example, a user may press and hold the button "1" until the system enters the setting mode, and then may enter or depress button "2" (if the first dipswitch is up) or button "3" (if the first dipswitch is down). The user may then depress the button "1" again to move to the next dipswitch and again enter or depress button "2" or "3" depending on the setting of the next dipswitch. This may be repeated until all of the dipswitches are set or input into the vehicle based system. Optionally, one or more of the inputs may be illuminated or backlit to signal that the user is in the setting mode. Optionally, the inputs 620a may include other indicia or characters indicative of their function when in the code setting mode, whereby the indicia or characters may be illuminated or backlit when the system enters the code setting mode. For example, the first input or button may include the word "enter", while the second button includes the number "0" and the third button includes the number "1" formed at a location near the input, such as above the input and on the membrane. The membrane may include one or more illumination sources that are operable to actuate and illuminate or backlight the words "enter", "0" and/or "1" when in the code setting mode, such that a user may readily understand how to set the code of the vehicle-based garage door opening system. When the system leaves the code setting mode, the illumination source or sources may be deactivated, whereby the words "enter", "0" and "1" (or other words or characters or icons or indicia or the like) may not be readily viewable by a user of the mirror assembly and garage door opening system. Other means for inputting the code into the system may be implemented without affecting the scope of the present invention.

The driver or user thus may input this multi-bit code to the mirror assembly or vehicle-based garage door opening system, such as via the user interface at the mirror assembly (or elsewhere in the vehicle), such as via a keypad at the mirror assembly, or such as via toggling through numbers and/or letters with a user input at the mirror assembly, where the selected or toggled numbers and/or letters or the like may be displayed at the mirror assembly, such as at a display on demand or transflective display at the mirror assembly. The vehicle transmitter then knows the code for that person's garage door opening mechanism, and may replicate the coded signal so that the garage door opening mechanism recognizes the signal when transmitted by the vehicle transmitter and opens or closes the garage door.

As shown in FIG. 10, the membrane 620 may be located at a lower corner of the reflective element and generally abutted against the corresponding region of the bezel. However, a membrane 620' may optionally, and desirably, be positioned above the mid-line 610a of the mirror assembly and toward the roof of the vehicle from the mid-line, such as at an upper corner of the reflective element, to enhance the accessibility and actuation of the membrane switches or inputs by a user. It is more desirable to position the membrane at the upper portion of the mirror reflective element because the bezel may partially interfere with a person's finger, especially if gloved, as it approaches the membrane when it is positioned along the lower portion of the reflective element. This is because a user (such as a driver or occupant sitting in a front seat of a vehicle) will typically approach the membrane inputs from below, and thus may encounter the extending or protruding bezel or be fouled by the bezel (which extends outwardly from the mirror and past the surface of the reflective element and past the membrane inputs) with their finger. Such an encounter or contact may foul actuation of the desired input. By positioning the membrane at an upper portion of the mirror assembly, the user may approach the membrane inputs from below, where there is no bezel or other obstruction immediately below the membrane, and may more readily actuate the desired input without interference by the mirror bezel.

Optionally, the cap portion and/or circuit board and/or mirror assembly may support one or more other accessories or features, such as one or more electrical or electronic devices or accessories. For example, illumination sources or lights, such as map reading lights or one or more other lights or illumination sources, such as illumination sources of the types disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; and/or 5,669,698, and/or U.S. patent application Ser. No. 10/054,633, filed Jan. 22, 2002, now U.S. Pat. No. 7,195,381; Ser. No. 10/745,056, filed Dec. 22, 2003 by Lynam et al. for LIGHT MODULE FOR INTERIOR REARVIEW MIRROR ASSEMBLY, now U.S. Pat. No. 6,971,775; and/or Ser. No. 10/933,842, filed Sep. 3, 2004 by Kulas et al. for INTERIOR REARVIEW MIRROR ASSEMBLY, now U.S. Pat. No. 7,249,860, which are hereby incorporated herein by reference, may be included in the mirror assembly. The illumination sources and/or the circuit board may be connected to one or more buttons or inputs for activating and deactivating the illumination sources.

Figure 9:
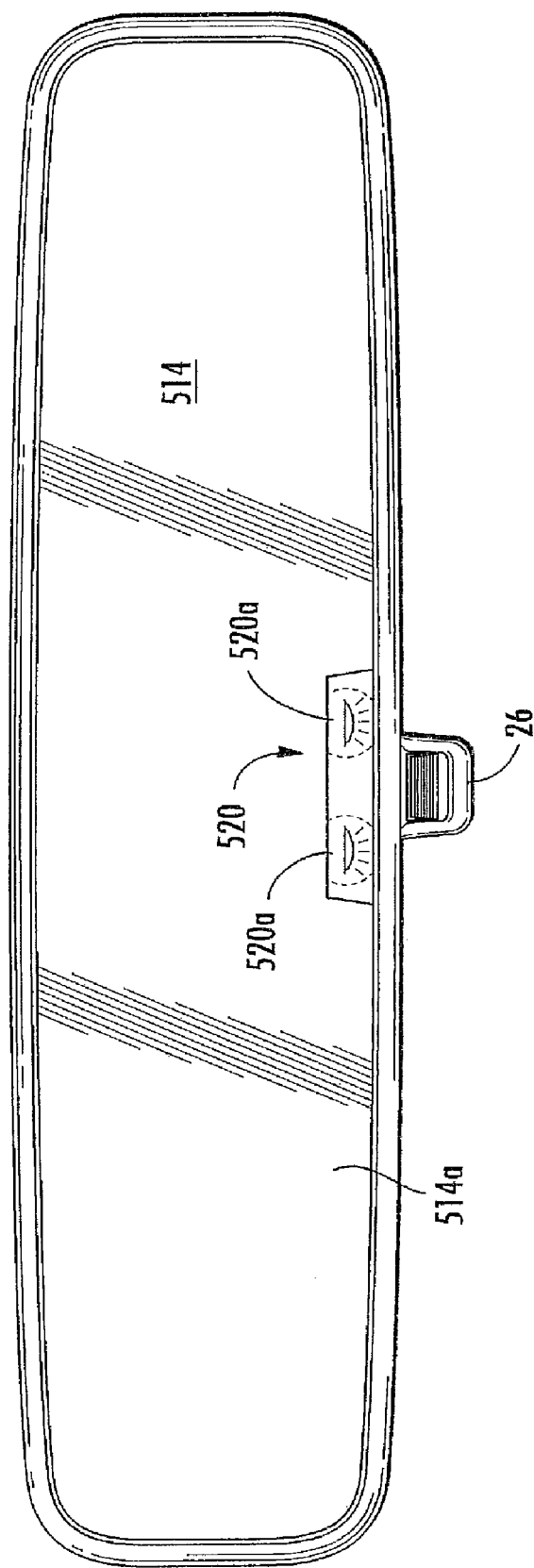
FIG. 9 is a front elevation of another interior rearview mirror assembly of the present invention.

With reference to FIG. 9, an overlay element or membrane 520 may be applied to or adhered or bonded to the front surface 514a of a reflective element 514, and may provide inputs or buttons 520a for activating/deactivating lights, such as map reading lights or the like of the mirror assembly or of the vehicle. The overlay element 520 may include icons or markings to indicate that they are for activating the lights. Optionally, the overlay element 520 may include illumination sources at or behind the buttons or inputs 520a (or the overlay element may be positioned over one or more ports in the reflective element with illumination sources behind the reflective element and generally aligned with the ports) to illuminate or backlight the inputs, such as when the lights are activated. The user inputs are thus readily viewable and discernable and accessible by a driver or occupant of the vehicle, so that the user may readily actuate the appropriate input to turn on or off the desired light of the mirror assembly.

Optionally, the cap portion and/or the circuit board and/or the mirror assembly may also or otherwise include other accessories, such as microphones, such as analog microphones or digital microphones or the like, such as microphones of the types disclosed in U.S. Pat. Nos. 6,243,003; 6,278,377; and/or 6,420,975, and/or in PCT Application No. PCT/US03/308877, filed Oct. 1, 2003 by Donnelly Corp. et al. for MICROPHONE SYSTEM FOR VEHICLE. Optionally, the cap portion and/or the circuit board and/or the mirror assembly may also or otherwise include other accessories, such as a telematics system, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 5,929,786 and/or 5,786,772, and/or U.S. patent application Ser. No. 10/427,051, filed Apr. 30, 2003, now U.S. Pat. No. 7,038,577; and Ser. No. 10/209,173, filed Jul. 31, 2002, now U.S. Pat. No. 6,882,287; and/or U.S. provisional application Ser. No. 60/638,687, filed Dec. 23, 2004, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 6,690,268 and 6,847,487; and/or U.S. provisional applications, Ser. No. 60/614,644, filed Sep. 30, 2004; Ser. No. 60/618,686, filed Oct. 14, 2004; Ser. No. 60/628,709, filed Nov. 17, 2004; Ser. No. 60/644,903, filed Jan. 11, 2005; Ser. No. 60/667,049, filed Mar. 31, 2005; and/or U.S. patent application Ser. No. 11/105,757, filed Apr. 14, 2005 (Attorney Docket DON01 P-1208), a slide out or extendable/retractable vide device or module, such as described in U.S. provisional applications, Ser. No. 60/630,061, filed Nov. 22, 2004; and/or Ser. No. 60/667,048, filed Mar. 31, 2005; and/or PCT Application No. PCT/US03/40611, filed Dec. 19, 2003, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display-a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124, 647; 6,294,989; 6,445,287; 6,472,979; and/or 6,731,205; and/or U.S. provisional application Ser. No. 60/611,796, filed Sep. 21, 2004, and/or an ONSTAR® system and/or any other accessory or circuitry or the like (with all of the above-referenced patents and PCT and U.S. patent applications being commonly assigned to Donnelly Corporation, and with the disclosures of the referenced patents and patent applications being hereby incorporated herein by reference in their entireties).

Although shown and described as having a prismatic reflective element, the interior rearview mirror assembly of the present invention may optionally have an electro-optic or electrochromic reflective element assembly or cell, with an overlay element or membrane applied to the front surface of the front substrate of the cell (the first surface of the reflective element assembly or cell). The electrochromic reflective element assembly of the electrochromic mirror assembly may utilize the principles disclosed in commonly assigned U.S. Pat. Nos. 6,690,298; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference, and/or as disclosed in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Granquist, EDS., Optical Engineering Press, Wash. (1990), which are hereby incorporated by reference herein; and/or as described in U.S. patent application Ser. No. 10/054,633, filed Jan. 22, 2002, now U.S. Pat. No. 7,195,381, which is hereby incorporated herein by reference. Optionally, the electrochromic circuitry and/or a glare sensor and circuitry and/or an ambient light sensor and circuitry may be provided on one or more circuit boards of the mirror assembly. The mirror assembly may include one or more other displays, such as the types disclosed in U.S. Pat. Nos. 5,530,240 and/or 6,329,925, which are hereby incorporated herein by reference, and/or display-on-demand transflective type displays, such as the types disclosed in U.S. Pat. Nos. 6,690,268; 5,668,663 and/or 5,724,187, and/or in U.S. patent application Ser. No. 10/054,633, filed Jan. 22, 2002 by Lynam et al. for VEHICULAR LIGHTING SYSTEM, now U.S. Pat. No. 7,195,381, and/or Ser. No. 11/021,065, filed Dec. 23, 2004 by McCabe et al. for ELECTRO-OPTIC MIRROR CELL, now U.S. Pat. No. 7,255,451; PCT Application No. PCT/US03/29776, filed Sep. 9, 2003 by Donnelly Corp. et al. for MIRROR REFLECTIVE ELEMENT ASSEMBLY; PCT Application No. PCT/US03/35381, filed Nov. 5, 2003 by Donnelly Corp. et al. for ELECTRO-OPTIC REFLECTIVE ELEMENT ASSEMBLY; and/or PCT Application No. PCT/US03/40611, filed Dec. 19, 2003 by Donnelly Corp. et al. for ACCESSORY SYSTEM FOR VEHICLE, which are all hereby incorporated herein by reference.

For example, and with reference to FIGS. 14-25, mirror assemblies 710, 710', 710", 710''' may each comprise a bezelless or frameless mirror assembly having a casing or housing 712 and an electro-optic, such as electrochromic or the like, reflective element assembly 714 (where the mirror reflective element is not recessed inward from a bezel region such as is shown in FIG. 11). Reflective element assembly 714 may include a front substrate 730 and a rear substrate 732 and electrochromic medium 734 disposed therebetween and contained therein via a seal 736, such as an epoxy seal or the like. A membrane or substrate or overlay element 720 (such as similar to those discussed above) may be disposed at or adhered to or otherwise applied to the front surface of the front substrate, while the conducting elements may be routed around the reflective element assembly and may connect to circuitry or circuit board at or behind the reflective element assembly. Because the mirror assembly may comprise a bezeless mirror assembly, such that the mirror reflector is substantially flush with the plastic casing, and thus may not have a bezel or casing portion extending outwardly of the reflective element assembly, the membrane inputs may be positioned at a lower portion of the reflective element assembly, and may be readily accessible and actuatable by a user. The mirror assemblies shown in FIGS. 14-25 may be substantially similar, with exception to the design and location of the membrane and inputs and/or the design and location of the sensor region (discussed below), such that a detailed discussion of the mirror assemblies will not be repeated herein.

Optionally, and as shown in FIGS. 14-16, the mirror assembly 710 may include a portion 712a that extends downward below the reflective element assembly 714 and provides a mounting or positioning location for a glare sensor 738 or a proximity sensor or human machine interface (HMI) or the like. The sensor thus may rest at or be housed in the portion 712a, which is below the front and rear substrates and generally flush with the substrates. The portion may comprise an injection molded portion and may be colored or tinted, such as a dark grey color or the like or other suitable or desired color, and may mask the circuit board 740 and frame the sensor 738. Optionally, and as shown with respect to mirror assembly 710" of FIGS. 20-22, the portion 712a may be positioned below and generally flush with the rear substrate and may be behind the front substrate so that the sensor receives light emanating from rearward of the vehicle through the front substrate. The front substrate thus may be formed to have a downward extending portion that overlaps or covers the portion 712a.

The front substrate of the mirror assembly may include a perimeter coating 737 that is disposed around the perimeter edge or portions of the rear surface of the front substrate, and the epoxy seal 736 may be disposed along the perimeter coating, such as described in U.S. patent application Ser. No. 11/021,065, filed Dec. 23, 2004, now U.S. Pat. No. 7,255,451; and/or Ser. No. 10/533,762, filed May 4, 2005, now U.S. Pat. No. 7,184,190; and/or U.S. provisional applications, Ser. No. 60/609,642, filed Sep. 14, 2004; Ser. No. 60/624,091, filed Nov. 1, 2004 by Karner et al. for MOUNTING ASSEMBLY FOR MIRROR AND METHOD OF MAKING SAME; Ser. No. 60/638,250, filed Dec. 21, 2004; Ser. No. 60/642,227, filed Jan. 7, 2005; and/or Ser. No. 60/653,787, filed Feb. 17, 2005, which are hereby incorporated herein by reference. The perimeter coating 737 may comprise an opaque material, and may comprise a white opaque coating material (such as shown in FIGS. 14, 15, 20 and 21), or may comprise a tinted or colored material to provide a suitable or desired appearance or contrast or color (such as a green or blue tint or other colored or tinted opaque band or colored or tinted reflective band or the like), such as utilizing aspects described in U.S. patent application Ser. No. 11/021,065, filed Dec. 23, 2004, now U.S. Pat. No. 7,255,451; and/or Ser. No. 10/533,762, filed May 4, 2005, now U.S. Pat. No. 7,184,190; and/or U.S. provisional applications, Ser. No. 60/609,642, filed Sep. 14, 2004; Ser. No. 60/624,091, filed Nov. 1, 2004 by Karner et al. for MOUNTING ASSEMBLY FOR MIRROR AND METHOD OF MAKING SAME; Ser. No. 60/638,250, filed Dec. 21, 2004; Ser. No. 60/642,227, filed Jan. 7, 2005; Ser. No. 60/653,787, filed Feb. 17, 2005; and/or Ser. No. 60/677,990, filed May 5, 2005, which are all hereby incorporated herein by reference.

Optionally, and with reference to FIGS. 17-19, mirror assembly 710' has the portion 712a behind a lower region of the front substrate and below and generally flush with the rear substrate, similar to the mirror assembly 710'' of FIGS. 20-22, but with the front substrate comprising a generally oval form, and thus without the downward extending portion. The perimeter coating 737 and seal 736 may be disposed around the perimeter of the front substrate 730, and may be disposed around a portion or region 712a, which may comprise an injection molding that may mask the circuit board and frame the sensor. Optionally, and as shown at mirror assembly 710''' of FIGS. 23-25, the region or portion at which the sensor is positioned may not be readily viewable through the front substrate, such that the glare sensor may be positioned behind the substrates and generally aligned with a window formed in the reflective coating on the rear substrate.

The perimeter coating thus may be disposed around the perimeter of the rear surface of the front substrate and disposed so as to form or define the region or area at the perimeter of the reflective element assembly. The seal may be disposed along the coating, and the coating may be substantially opaque to substantially hide or conceal the seal. The seal thus may be disposed around or above the region or portion, such that the portion provides a mounting or positioning location for the glare sensor or the like. The sensor thus may be positioned behind the front substrate and may receive or detect light passing through the substrate at the region, where there is no electrochromic medium or seal, such that the region is substantially transmissive of light emanating from the rear of the vehicle. The sensor thus may be positioned substantially within the perimeter of the reflective element assembly and may be positioned within an overhang region (defined by an offset between the front and rear substrates), such that the reflective element may be substantially bezel-less or frameless, such as described in U.S. patent application Ser. No. 11/021,065, filed Dec. 23, 2004, now U.S. Pat. No. 7,255,451; and/or Ser. No. 10/533,762, filed May 4, 2005, now U.S. Pat. No. 7,184,190; and/or U.S. provisional applications, Ser. No. 60/609,642, filed Sep. 14, 2004; Ser. No. 60/624,091, filed Nov. 1, 2004 by Karner et al. for MOUNTING ASSEMBLY FOR MIRROR AND METHOD OF MAKING SAME; Ser. No. 60/638,250, filed Dec. 21, 2004; Ser. No. 60/642,227, filed Jan. 7, 2005; Ser. No. 60/653,787, filed Feb. 17, 2005; and/or Ser. No. 60/677,990, filed May 5, 2005, which are hereby incorporated herein by reference.

Optionally, the electrochromic reflective element may include one or more displays, such as for the accessories or circuitry described above. The displays may be similar to those described above, or may be of types disclosed in U.S. Pat. Nos. 5,530,240 and/or 6,329,925, which are hereby incorporated herein by reference, and/or may be display-on-demand or transflective type displays, such as the types disclosed in U.S. Pat. Nos. 6,690,298; 5,668,663 and/or 5,724,187, and/or in U.S. patent application Ser. No. 10/054,633, filed Jan. 22, 2002, now U.S. Pat. No. 7,195,381; and/or Ser. No. 10/993,302, filed Nov. 19, 2004, now U.S. Pat. No. 7,338,177; and/or in U.S. provisional application Ser. No. 60/525,952, filed Nov. 26, 2003 by Lynam for MIRROR REFLECTIVE ELEMENT FOR A VEHICLE, and/or in PCT Application No. PCT/US03/29776, filed Sep. 19, 2003 by Donnelly Corp. et al. for MIRROR REFLECTIVE ELEMENT ASSEMBLY, which are all hereby incorporated herein by reference.

Therefore, the present invention provides an interior rearview mirror assembly which may have features, such as electronic accessories and/or displays or the like. The flexible overlay element or membrane, with its integral flexible electrical connector ribbon harness (connectable to or connecting to an accessory such as a PCB disposed to the back of the mirror reflective element when the mirror reflective element is mounted in the rearview mirror assembly), of the present invention may be readily applied via a pressure-sensitive adhesive (or the like) conveyed with the overlay element that (when a protective cover strip is removed) adheres when pressed to the front surface of the reflective element to provide user inputs and/or displays and/or illumination sources at the reflective element where they are readily viewable and accessible by a driver or occupant of the vehicle. Such overlay elements are sealed and moisture protected/impervious at least sufficient for use in the interior of a vehicle, including convertibles. The desired user inputs (preferably membrane switches with tactile feedback) or displays thus may be selected and readily applied to a substantially common or universal reflective element to provide the desired feature for the particular application of the reflective element in a manner very amenable to the mirror assembler adding such features as required in a very economical manner. The overlay element or membrane and the associated switches or inputs and/or displays and/or illumination sources thus may be applied or added to a mirror assembly in an efficient manner, and thus may substantially reduce the labor involved in adding such electrical content to a mirror assembly. The overlay element or membrane thus provides for selective customization or personalization of the mirror assembly, while utilizing substantially common components. The automobile manufacturer or the consumer may further select an icon or indicia or personalization for the overlay element to further customize the appearance of the overlay element and thus of the mirror assembly. The surface finish of the overlay element that is touched by the driver or any other occupant of the vehicle has a surface finish, such as a matte or diffuser finish with low specular reflectance, or texture that does not overly or readily show fingerprints or smears or the like as can occur when a glass surface (that typically exhibits at least about 4 percent specular reflection) is touched by a human finger.

Changes and modification in the specifically described embodiments may be carried out without departing from the principles of the present invention, which is intended to be limited only by the scope of the appended claims as interpreted according to the principles of patent law.

The embodiments of the invention in which an exclusive property or privilege is claimed are defined as follows:

1. An interior rearview mirror assembly suitable for use in a vehicle, said interior rearview mirror assembly comprising:
   a mirror reflective element having a front surface and a rear surface, said front surface being viewable by and directed generally toward a driver of the vehicle when said mirror assembly is installed in the vehicle;
   said mirror reflective element comprising a reflector;
   wherein said mirror reflective element comprises a transflective mirror reflective element and wherein said reflector comprises a transflector, said transflector comprising a coating on a surface of a substrate of said mirror reflective element that is partially transmissive to visible light and partially reflective of light incident thereon;
   a display element disposed to the rear of said rear surface of said mirror reflective element of said rearview mirror assembly, said display element operable to emit light when actuated, said emitted light passing through said mirror reflective element to be viewable to a driver of the vehicle viewing said front surface when said mirror assembly is installed in the vehicle;

wherein said emitted light passes through said transflector of said mirror reflective element to be viewable to a driver viewing said front surface when said mirror assembly is installed in the vehicle;

a garage door opener device included in said rearview mirror assembly;

said rearview mirror assembly including at least one user actuatable input device associated with operation of said garage door opener device; and wherein, when said garage door opener device is operating in a training mode, an icon is intermittently illuminated by a backlighting light emitting diode, and wherein, when said garage door opener device is operating other than in a training mode, said icon is constantly illuminated by said backlighting light emitting diode, and wherein said icon assists a user when said garage door opener is in a training mode.

2. The rearview mirror assembly of claim 1, wherein said at least one user actuatable input device comprises at least three user actuatable input devices.

3. The rearview mirror assembly of claim 2, wherein said three user actuatable input devices are disposed at a bezel portion of said rearview mirror assembly.

4. The rearview mirror assembly of claim 1, wherein said display element, when actuated, forms a visual icon viewable by that driver that is indicative of a garage door opener.

5. The rearview mirror assembly of claim 1, wherein at least one of (a) said user actuatable input device and (b) said icon is included as an overlay element applied onto and at least partially over a portion of said front surface of said reflective element.

6. The rearview mirror assembly of claim 1, wherein said display element comprises said backlighting light emitting diode.

7. The rearview mirror assembly of claim 1, wherein an actuation of at least one user actuatable input device causes said display element to provide a visual indication to the driver viewing said front surface of said mirror reflective element, when said mirror assembly is installed in the vehicle, of at least one of (i) operation of said garage door opener device and (ii) coding said garage door opener device.

* * * * *

UNITED STATES PATENT AND TRADEMARK OFFICE
CERTIFICATE OF CORRECTION

PATENT NO. : 7,690,824 B2 Page 1 of 1
APPLICATION NO. : 12/107357
DATED : April 6, 2010
INVENTOR(S) : John T. Uken and Niall R. Lynam It is certified that error appears in the above-identified patent and that said Letters Patent is hereby corrected as shown below:

Column 4:
Line 19, "spectrally" should be --specularly--.

Column 7:
Line 17, "spectrally" should be --specularly--.

Column 13:
Line 44, "he" should be --be--.

Column 14:
Line 63, "spectrally" should be --specularly--.

Signed and Sealed this

Twenty-seventh Day of July, 2010

David J. Kappos
*Director of the United States Patent and Trademark Office*